United States Patent
Takahashi

[19]
[11] Patent Number: 5,815,326
[45] Date of Patent: *Sep. 29, 1998

[54] IMAGE DISPLAY APPARATUS

[75] Inventor: Koichi Takahashi, Hachioji, Japan

[73] Assignee: Olympus Optical Co., Ltd., Tokyo, Japan

[*] Notice: The term of this patent shall not extend beyond the expiration date of Pat. No. 5,699,194.

[21] Appl. No.: 653,316

[22] Filed: May 24, 1996

[30] Foreign Application Priority Data

May 26, 1995 [JP] Japan .................................. 7-127896

[51] Int. Cl.$^6$ ......................... G02B 13/10; G02B 17/00; G02B 27/14
[52] U.S. Cl. ........................... 359/729; 359/669; 359/633
[58] Field of Search .................... 359/668, 669, 359/727, 728, 729, 737, 630, 633

[56] References Cited

U.S. PATENT DOCUMENTS

| | | | |
|---|---|---|---|
| 4,026,641 | 5/1977 | Bosserman et al. | |
| 4,322,135 | 3/1982 | Freeman | |
| 4,669,810 | 6/1987 | Wood | |
| 4,761,064 | 8/1988 | Mercado et al. | 359/797 |
| 5,042,928 | 8/1991 | Richards | 359/727 |
| 5,699,194 | 12/1997 | Takahashi | 359/633 |
| 5,731,903 | 10/1996 | Cook | 359/633 |

FOREIGN PATENT DOCUMENTS 62-214782  9/1987  Japan .
3-101709   4/1991  Japan .
6-242393   9/1994  Japan .

*Primary Examiner*—Georgia Y. Epps
*Assistant Examiner*—Ricky Mack
*Attorney, Agent, or Firm*—Cushman Darby & Cushman IP Group of Pillsbury Madison & Sutro LLP

[57] ABSTRACT

An image display apparatus which enables observation of a clear image at a wide field angle, and which is extremely small in size and light in weight and hence unlikely to cause the observer to be fatigued. The image display apparatus has an image display device (7) and an ocular optical system for projecting the image of the image display device and leading the projected image to an observer's eyeball (1). The ocular optical system has, in the order of backward ray tracing, a first surface (3) which is a refracting surface, a second surface (4) which is a decentered reflecting surface of positive power, a third surface (5) which is a decentered reflecting surface, and a fourth surface (6) which is a refracting surface. At least two of the four surfaces have a finite curvature radius. A space formed by the first to fourth surfaces (3 to 6) is filled with a medium having a refractive index larger than 1. The two reflecting surfaces are disposed such that the principal ray extending from the observer's eyeball (1) to the image display device (7) does not intersect its own path in the ocular optical system. Thus, the first-order image of the image display device (7) is formed on the retina of the observer's eyeball.

22 Claims, 15 Drawing Sheets

Two-dimensional image display device

Observer's eyeball position

Relay optical system

Concave reflecting mirror

P1

Concave reflecting mirror

Observer's eyeball position

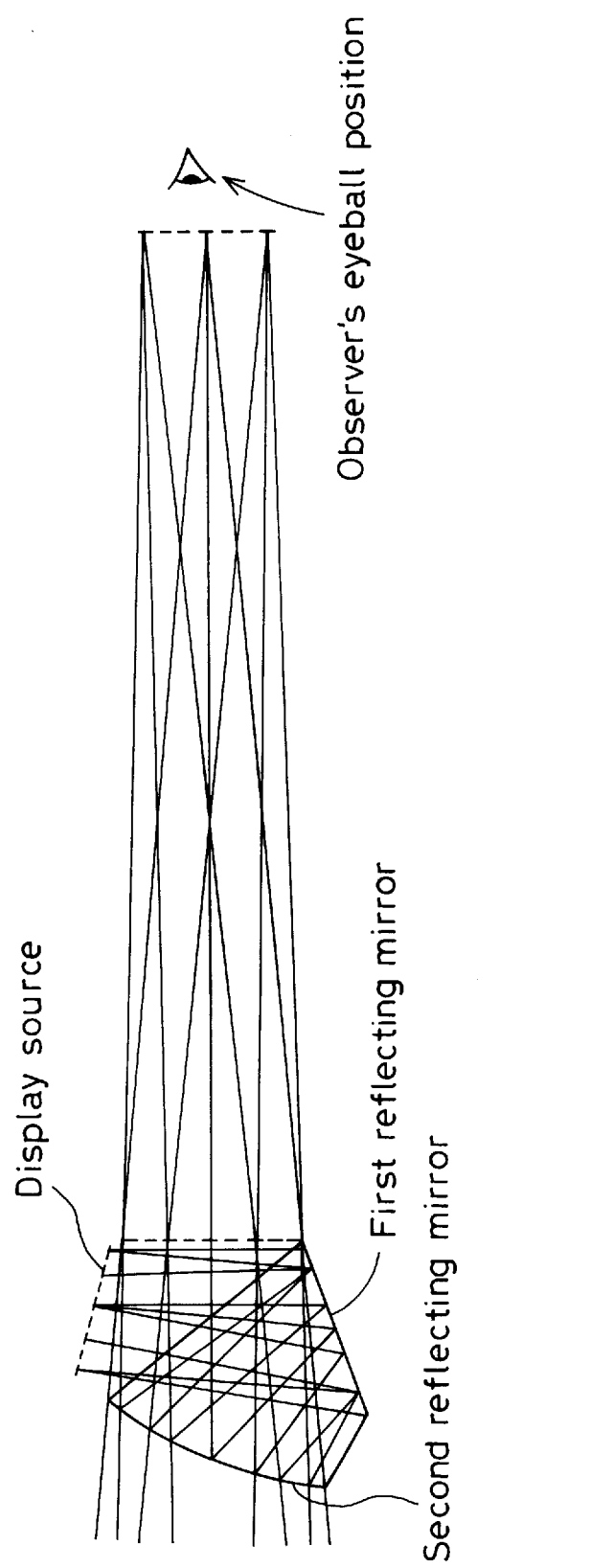

IMAGE DISPLAY APPARATUS

BACKGROUND OF THE INVENTION

1. Field of the Invention

The present invention relates to an image display apparatus and, more particularly, to a head- or face-mounted image display apparatus that can be retained on the observer's head or face.

2. Description of Related Art

As an example of conventional head- or face-mounted image display apparatus, an image display apparatus disclosed in Japanese Patent Application Unexamined Publication (KOKAI) No. 3-101709 (1991) is known. FIG. 21(a) shows the entire optical system of the conventional image display apparatus, and FIG. 21(b) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of convention image display apparatus. In this apparatus, as shown in FIG. 22, an image of a CRT is transmitted through a relay optical system to form an intermediate image, and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIG. 23, the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 24, an image of an image display device is transferred to a curved object surface by an image transfer device, and the image transferred to the object surface is projected in the air by a toric reflector.

Japanese Patent Application Unexamined Publication (KOKAI) No. 6-242393 (1994) discloses another type of conventional image display apparatus. In this apparatus, as shown in FIG. 25, a bundle of light rays from a display source is successively reflected by a first reflecting mirror and a second reflecting mirror so as to reach an observer's eyeball along a "4"-shaped optical path.

However, an image display apparatus of the type in which an image of an image display device is relayed, as in the image display apparatuses shown in FIGS. 21(a), 21(b) and 22, must use several lenses as a relay optical system in addition to an ocular optical system, regardless of the type of ocular optical system. Consequently, the optical path length increases, and the optical system increases in both size and weight.

In a case where only the ocular optical system shown in FIG. 21(a) is used, as shown in FIG. 21(b), positive power resides in only the reflecting surface that has a concave surface directed toward the observer. Therefore, large negative field curvature is produced as shown by reference character P1 in the figure.

In a layout such as that shown in FIG. 23, the amount to which the apparatus projects from the observer's face undesirably increases. Further, since an image display device and an illumination optical system are attached to the projecting portion of the apparatus, the apparatus becomes increasingly large in size and heavy in weight.

Since a head-mounted image display apparatus is fitted to the human body, particularly the head, if the amount to which the apparatus projects from the user's face is large, the distance from the supporting point on the head to the center of gravity of the apparatus is long. Consequently, the weight of the apparatus is imbalanced when the apparatus is fitted to the observer's head, causing the observer to be readily fatigued. Further, when the observer moves or turns with the apparatus fitted to his/her head, the apparatus may collide with something. That is, it is important for a head-mounted image display apparatus to be small in size and light in weight. An essential factor in determining the size and weight of the apparatus is the arrangement of the optical system.

However, if an ordinary magnifier alone is used as an ocular optical system, exceedingly large aberrations are produced, and there is no device for correcting them. Even if spherical aberration can be corrected to a certain extent by forming the configuration of the concave surface of the magnifier into an aspherical surface, other aberrations such as coma and field curvature remain. Therefore, if the field angle is increased, the image display apparatus becomes impractical. Alternatively, if a concave mirror alone is used as an ocular optical system, it is necessary to use not only ordinary optical elements (lens and mirror) but also a device for correcting field curvature by an image transfer device (fiber plate) having a surface which is curved in conformity to the field curvature produced, as shown in FIG. 24.

In a case where two reflecting mirrors are disposed as shown in FIG. 25 also, the image is projected into the observer's eyeball by only the positive power of the second reflecting mirror; therefore, large negative field curvature which cannot be corrected by another surface is produced in the ocular optical system.

SUMMARY OF THE INVENTION

In view of the above-described problems of the conventional techniques, an object of the present invention is to provide an image display apparatus which enables observation of a clear image at a wide field angle, and which is extremely small in size and light in weight and hence unlikely to cause the observer to be fatigued.

To attain the above-described object, the present invention provides an image display apparatus which has an image display device for displaying an image, and an ocular optical system for projecting the image displayed by the image display device and leading the projected image to an observer's eyeball. The ocular optical system has at least four surfaces which include, in the order in which light rays pass in backward ray tracing from the observer's eyeball to the image display device, a first surface which is a refracting surface, a second surface which is a reflecting surface of positive power facing the first surface and decentered with respect to an observer's visual axis, a third surface which is a reflecting surface facing the second surface and decentered with respect to the observer's visual axis that has been reflected by the second surface, and a fourth surface which is a refracting surface closest to the image display device. At least two of the at least four surfaces have a finite curvature radius. A space formed by the first to fourth surfaces is filled with a medium having a refractive index larger than 1. The two reflecting surfaces are disposed such that the principal ray extending from the observer's eyeball to the image display device does not intersect its own path in the ocular optical system. Thus, the first-order image of the image display device is formed on the retina of the observer's eyeball.

In this case, it is desirable for the third surface to be a reflecting surface having a convex surface directed toward the second surface.

The present invention provides another image display apparatus which has an image display device for displaying an image, and an ocular optical system for projecting the image displayed by the image display device and leading the projected image to an observer's eyeball. The ocular optical system includes a decentered optical element having at least four surfaces which include, in the order in which light rays pass in backward ray tracing from the observer's eyeball to the image display device, a first surface which is a refracting surface, a second surface which is a reflecting surface of positive power facing the first surface and decentered with respect to an observer's visual axis, a third surface which is a reflecting surface facing the second surface and decentered with respect to the observer's visual axis that has been reflected by the second surface, and a fourth surface which is a refracting surface closest to the image display device. At least two of the at least four surfaces have a finite curvature radius. A space formed by the first to fourth surfaces is filled with a medium having a refractive index larger than 1. The ocular optical system further includes at least one optical surface having refracting action. The decentered optical element and the at least one optical surface are disposed in an optical path extending from the image display device to the observer's eyeball.

The operation of the image display apparatus according to the present invention will be explained below. The following explanation will be made on the basis of backward ray tracing in which light rays are traced from the observer's pupil position toward the image display device for the convenience of designing the optical system.

In the present invention, a space that is formed by the first, second, third and fourth surfaces of the ocular optical system is filled with a medium having a refractive index larger than 1, and two of the four surfaces are provided with a finite curvature radius, thereby making it possible to correct spherical aberration, coma and field curvature produced by the second surface, which is decentered or tilted, and thus succeeding in providing the observer with a clear observation image having a wide exit pupil diameter and a wide field angle.

Concave mirrors generally have such a nature that, if strong power is given to the concave surface, the Petzval sum increases, and positive field curvature is produced. In addition, strong negative comatic aberration is produced. In the present invention, the space formed by the first, second, third and fourth surfaces is filled with a medium having a refractive index larger than 1, and two of the four surfaces are provided with a finite curvature radius, thereby succeeding in correcting aberrations produced by the second surface.

In a case where the first surface has a finite curvature radius in addition to the second surface, it is possible to reduce the height at which rays are incident on the second surface by using the refraction of the rays at the first surface. By this action, strong negative comatic aberration produced by the second surface, which is a concave mirror, can be reduced to a relatively low level.

In a case where the third surface has a finite curvature radius in addition to the second surface, it can effectively correct comatic aberration and field curvature which are produced by the second surface.

In a case where the fourth surface has a finite curvature radius in addition to the second surface, if the fourth surface is provided with negative power, it becomes possible to correct field curvature produced by the second surface in particular.

Further, the overall size of the apparatus can be effectively reduced by disposing the second and third surfaces, which are reflecting surfaces, such that the principal ray extending from the observer's eyeball to the image display device does not intersect its own path in the ocular optical system. To widen the field angle in particular, since the two reflecting surfaces, i.e. the second and third surfaces, are disposed approximately parallel to each other, the device can be formed in a thinner structure than in a case where the principal ray intersects its own path in the ocular optical system. Thus, it is possible to realize an even more light-weight apparatus.

Further, unlike a conventional arrangement in which an observation image of an image display device is formed in the air as a real intermediate image by a relay optical system and projected into an eyeball as an enlarged image by an ocular optical system, the image display apparatus of the present invention is arranged to project the image of the image display device directly into an observer's eyeball as an enlarged image, thereby enabling the observer to see the enlarged image of the image display device as a virtual image. Accordingly, the optical system can be formed from a relatively small number of optical elements. Further, since the second surface of the ocular optical system, which is a reflecting surface, can be disposed immediately in front of the observer's face in a configuration conformable to the curve of his/her face, the amount to which the optical system projects from the observer's face can be reduced to an extremely small value. Thus, a compact and light-weight image display apparatus can be realized.

It is effective for aberration correction that the third surface is a reflecting surface having a convex surface directed toward the second surface. Since the second surface is a principal reflecting surface having positive power in the whole ocular optical system, it produces field curvature to a considerable extent in addition to the above-described comatic aberration. The negative comatic aberration produced by the second surface can be corrected by allowing the third surface to have negative power so that the third surface produces comatic aberration which is opposite in sign to the comatic aberration produced by the second surface. The positive field curvature produced by the second surface can be simultaneously corrected by producing negative field curvature at the third surface.

It is also effective for aberration correction that any one of the first, second, third and fourth surfaces of the ocular optical system is a decentered aspherical surface.

This is an important condition for correcting comatic aberration, particularly higher-order comatic aberration, or coma flare produced by the second surface, which is decentered in the direction Y in the coordinate system (described later) or tilted with respect to the visual axis.

In an image display apparatus which uses an ocular optical system of the type having a decentered or tilted reflecting surface in front of an observer's eyeball as in the present invention, light rays are obliquely incident on the reflecting surface even on the observer's visual axis, causing comatic aberration to occur. The comatic aberration increases as the inclination angle of the reflecting surface becomes larger.

However, if it is intended to realize a compact and wide-field image display apparatus, it is difficult to ensure an observation image having a wide field angle unless the amount of eccentricity (decentration) or the angle of inclination is increased to a certain extent because of the interference between the image display device and the optical path. Accordingly, as the field angle of an image display apparatus becomes wider and the size thereof becomes smaller, the inclination angle of the reflecting surface becomes larger. As a result, how to correct higher-order comatic aberration becomes a serious problem.

To correct such complicated comatic aberration, any one of the first, second, third and fourth surfaces constituting the ocular optical system is formed into a decentered aspherical surface. By doing so, the power of the optical system can be made asymmetric with respect to the visual axis. Further, the effect of the aspherical surface can be utilized for off-axis aberration. Accordingly, it becomes possible to effectively correct comatic aberrations, including axial aberration.

Assuming that the direction of the observer's visual axis is taken as the Z-axis, where the direction toward the ocular optical system from the origin is defined as the positive direction, one axis which perpendicularly intersects the observer's visual axis is taken as the Y-axis, and the other axis which perpendicularly intersects both the Z- and Y-axes is taken as the X-axis, it is useful in the present invention to satisfy the following condition:

$$0 < R_{y3}/R_{y2} < 4 \qquad (1)$$

where $R_{y2}$ is the curvature radius of the second surface in the YZ-plane, and $R_{y3}$ is the curvature radius of the third surface in the YZ-plane.

The above expression (1) is an effective condition for correcting comatic aberration, particularly higher-order comatic aberration, or coma flare produced by the second surface, which is decentered in the direction Y or tilted. It is particularly important to satisfy the condition (1) when the inclination angle or the eccentricity in the direction Y of the second surface, which is a reflecting surface, is large.

As has been described above, in an image display apparatus which uses an ocular optical system of the type having a tilted reflecting surface in front of an observer's eyeball as in the present invention, the inclination angle of the reflecting surface becomes larger as the field angle of the image display apparatus becomes wider and the size thereof becomes smaller, and how to correct higher-order comatic aberration becomes a serious problem. Since the second surface is a principal reflecting surface having positive power in the whole ocular optical system, the aberrations produced by the second surface can be effectively corrected by the third surface as a reflecting surface, which can be made stronger in power than a refracting surface. In this case, it is important that the ratio of the power of the second surface to the power of the third surface should satisfy the condition (1). If $R_{y3}/R_{y2}$ is not smaller than the upper limit of the condition (1), i.e. 4, the power of the third surface becomes undesirably small. Consequently, the above-described aberration correction effect cannot be satisfactorily obtained.

Further, it is important that any one of the first, second, third and fourth surfaces of the ocular optical system should be an anamorphic surface. That is, any one of the four surfaces should be a surface in which the curvature radius in the YZ-plane and the curvature radius in the XZ-plane, which perpendicularly intersects the YZ-plane, are different from each other.

The above is a condition for correcting aberration which occurs because the second surface is decentered or tilted with respect to the visual axis. In general, if a spherical surface is decentered, the curvature relative to light rays incident on the surface in the plane of incidence and that in a plane perpendicularly intersecting the incidence plane differ from each other. Therefore, in an ocular optical system where a reflecting surface is disposed in front of an observer's eyeball in such a manner as to be decentered or tilted with respect to the visual axis as in the present invention, an image on the visual axis lying in the center of the observation image is also astigmatically aberrated for the reason stated above. In order to correct the axial astigmatism, it is important that any one of the first, second, third and fourth surfaces of the ocular optical system should be formed so that the curvature radius in the plane of incidence and that in a plane perpendicularly intersecting the incidence plane are different from each other.

Further, it is important to satisfy the following condition:

$$R_{y2}/R_{x2} > 1 \qquad (2)$$

where $R_{y2}$ is the curvature radius of the second surface in the YZ-plane, and $R_{x2}$ is the curvature radius of the second surface in the XZ-plane.

The above expression (2) is a condition for correcting aberrations, particularly axial and other astigmatic aberrations, which occur because the second surface is tilted with respect to the visual axis. In general, as the field angle becomes larger, higher-order astigmatic aberrations appear. In a convex lens system, as the field angle becomes larger, the meridional image increases in the negative direction, whereas the sagittal image increases in the positive direction. In order to correct these astigmatic aberrations, it is necessary to arrange the optical system such that the power in the meridional plane is reduced, whereas the power in the sagittal plane is increased. Accordingly, with regard to the curvature radius in one plane, the curvature radius should be increased in the direction Y and reduced in the direction X.

In the ocular optical system of the present invention, a principal surface having positive power is the second surface, which is a reflecting surface. Therefore, for the second surface to satisfy the condition (2) it is preferable to for another surface to have a difference between the curvature radii in the YZ- and XZ-planes. That is, astigmatism correction can be made even more effectively by allowing the second surface to satisfy the condition (2); this is preferable in terms of aberration correction.

Further, it is desirable for either one of the first and fourth surfaces of the ocular optical system to be tilted or decentered with respect to the visual axis. By tilting or decentering either one of the first and fourth surfaces, it becomes possible to correct comatic aberrations asymmetrically introduced into an image which lies closer to the image display device as viewed from the visual axis and into an image which lies on the opposite side, and also possible to place the image display device at a plane which is approximately perpendicular to the optical axis that has been reflected by the second surface. This is effective when an image display device which is inferior in viewing angle characteristics is used.

Further, it is desirable in the present invention to satisfy the following condition:

$$30° < \alpha < 80° \qquad (3)$$

where $\alpha$ is the angle between the second surface of the ocular optical system and the visual axis.

The condition (3) must be satisfied in order to prevent the apparatus from interfering with the observer's head. If the angle α is not larger than the lower limit of the condition (3), i.e. 30°, light rays reflected by the second surface are at an angle of 90° or more to the visual axis. Therefore, image-formation positions of extra-axial light rays at the upper and lower ends of the image field are exceedingly far away from each other, and thus the arrangement becomes impractical. Conversely, if the angle α is not smaller than the upper limit of the condition (3), i.e. 80°, light rays reflected by the second surface undesirably return toward the observer's face, causing the image display apparatus to interfere with the observer's face.

It is important that the display surface of the image display device should be tilted with respect to the visual axis. In a case where a refracting or reflecting surface that constitutes an optical element is decentered or tilted, the angle at which light rays from the pupil are refracted or reflected by the refracting or reflecting surface varies according to the image height. Therefore, the image surface may be tilted with respect to the visual axis. The tilt of the image surface can be corrected by tilting the display surface of the image display device with respect to the visual axis.

Incidentally, as the field angle of an image display apparatus widens and the size thereof decreases, the inclination angle of the second surface, which is the first reflecting surface, increases, and higher-order comatic aberrations produced thereby increase. Further, astigmatism that is produced by the inclination of the surface also increases. Accordingly, it may be difficult to satisfactorily correct these aberrations by only a decentered optical element which has at least four surfaces including, in the order in which light rays pass in backward ray tracing from the observer's eyeball to the image display device, a first surface which is a refracting surface, a second surface which is a reflecting surface of positive power facing the first surface and decentered with respect to the observer's visual axis, a third surface which is a reflecting surface facing the second surface and decentered with respect to the observer's visual axis that has been reflected by the second surface, and a fourth surface which is a refracting surface closest to the image display device, in which at least two of the at least four surfaces have a finite curvature radius, and in which a space formed by the first to fourth surfaces is filled with a medium having a refractive index larger than 1.

Therefore, at least one optical surface having refracting action is disposed, in addition to the above-described decentered optical element, between the observer's eyeball and the image display device, thereby making it possible to correct aberrations produced in the ocular optical system even more effectively.

In the decentered optical element of the present invention, the second surface and the third surface are reflecting surfaces. Therefore, no chromatic aberration is produced at these surfaces. Further, at the fourth surface, which lies in close proximity to the image display device, the principal ray is approximately parallel to the optical axis. Therefore, the fourth surface produces minimal chromatic aberration. Consequently, chromatic aberration produced by the first surface is dominant in the ocular optical system. Further, in a wide-field optical system such as that in the present invention, lateral chromatic aberration appears more markedly than axial chromatic aberration.

That is, it is important to correct lateral chromatic aberration produced by the first surface, and it is possible to display an image which is clearer and of higher resolution by correcting the lateral chromatic aberration. Accordingly, the ocular optical system is preferably arranged such that the decentered optical element, together with at least one optical surface having refracting action, is disposed between the observer's eyeball and the image display device. By doing so, optical elements constituting the ocular optical system can be composed of two or more different mediums, and it becomes possible to correct the lateral chromatic aberration by virtue of the difference in Abbe's number between these mediums.

As has been described above, it is important in the ocular optical system of the present invention to correct chromatic aberration produced by the first surface of the decentered optical element. The chromatic aberration can be corrected by forming the above-described at least one optical surface from a surface which produces chromatic aberration which is approximately equal in quantity but opposite in sign to the chromatic aberration produced by the first surface.

The correction of chromatic aberration will be explained below more specifically. By disposing the decentered optical element, together with at least one optical surface having refracting action, in the optical path extending from the image display device to the observer's eyeball, the ocular optical system can be composed of two or more different mediums. In this case, lateral chromatic aberration can be corrected by virtue of the Abbe's number difference between the different mediums. For instance, let us consider a case where a negative refracting lens, which is different from the medium of the decentered optical element, is cemented to the first surface of the decentered optical element. Achromatic conditions for the entire optical system are given by $$f_1 = (v_1 - v_2) \cdot f / v_1$$

$$f_2 = -(v_1 - v_2) \cdot f / v_2$$

$$1/f = 1/f_1 + 1/f_2$$

where f is the focal length of the entire optical system, $f_1$ is the focal length of the decentered optical element, $v_1$ is the Abbe's number of the decentered optical element, $f_2$ is the focal length of the refracting lens, and $v_2$ is the Abbe's number of the refracting lens.

The focal length f of the ocular optical system and the focal length $f_1$ of the decentered optical element are positive, and the focal length $f_2$ of the refracting lens is negative. Hence, the relationship between the Abbe's numbers of the decentered optical element and the refracting lens is given by $v_1 > v_2$. That is, by using a medium having a smaller Abbe's number to form the refracting lens in this case, chromatic aberration can be effectively corrected.

In a case where at least one optical surface is present at a position other than the above, Abbe's numbers of the mediums can be set in the same manner as in the above-described example.

In a case where at least one optical surface having positive refractive power is disposed between the decentered optical element and the observer's eyeball, the beam diameter at the second surface of the decentered optical element becomes small, and hence higher-order comatic aberrations reduce. Therefore, it is possible to observe a clear image as far as the edges of the display surface of the image display device. Further, since a principal ray at the edge of the image is refracted by the at least one optical surface having positive refractive power, the height of the ray incident on the decentered optical element can be reduced. Therefore, it becomes possible to set a larger field angle than in a case where the decentered optical element alone is used.

In a case where the above-described at least one optical surface is disposed between the second and third surfaces of the decentered optical element, the ray bundle reflected by the second surface is refracted by the at least one optical surface so that the ray height at the third surface is reduced. Accordingly, the extra-axial rays passing through the first surface and the extra-axial rays reflected by the third surface are unlikely to interfere with each other.

In a case where the above-described at least one optical surface is disposed between the fourth surface of the decentered optical element and the image display device, if the optical surface has negative power, since the position of the optical surface is closest to the image display device, it is possible to correct field curvature produced by the decentered optical element.

By decentering the above-described at least one optical surface with respect to the visual axis, it is possible to correct comatic aberrations asymmetrically introduced into an image which lies closer to the image display device as viewed from the visual axis and into an image which lies on the opposite side, and also possible to allow the optical axis to lie approximately perpendicular to a plane at which the image display device is placed.

By using a cemented lens to form the above-described at least one optical surface, lateral chromatic aberration produced by the optical surface can be corrected; this is useful to ensure a clearer image and a wider field angle.

By forming the above-described at least one optical surface and the surface of the decentered optical element that faces the optical surface into concave surfaces, an air lens is formed. In this case, since the negative powers of the two surfaces can be effectively utilized, the Petzval sum in the entire optical system can be minimized. Thus, field curvature produced by the second surface of the decentered optical element can be effectively corrected.

It should be noted that it becomes possible for the observer to see a stable observation image by providing a device for positioning both the image display device and the ocular optical system with respect to the observer's head.

By allowing both the image display device and the ocular optical system to be fitted to the observer's head with a supporting device, it becomes possible for the observer to see the observation image in a desired posture and from a desired direction.

Further, it becomes possible for the observer to see the observation image with both eyes without fatigue by providing a device for supporting at least two image display apparatuses at a predetermined spacing. Further, if images with a disparity therebetween are displayed on the right and left image display surfaces, and these images are observed with both eyes, it is possible to enjoy viewing a stereoscopic image.

Further, if an ocular optical system according to the present invention is arranged to form an image of an object at infinity with the image display device surface in the ocular optical system defined as an image surface, the optical system can be used as an imaging optical system, e.g. a finder optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 25 shows the optical system of a still further conventional image display apparatus.

DESCRIPTION OF THE PREFERRED EMBODIMENTS

Examples 1 to 17 of the image display apparatus according to the present invention will be described below with reference to FIGS. 1 to 17, which are sectional views of optical systems designed for a single eye according to Examples 1 to 17.

Figure 1:
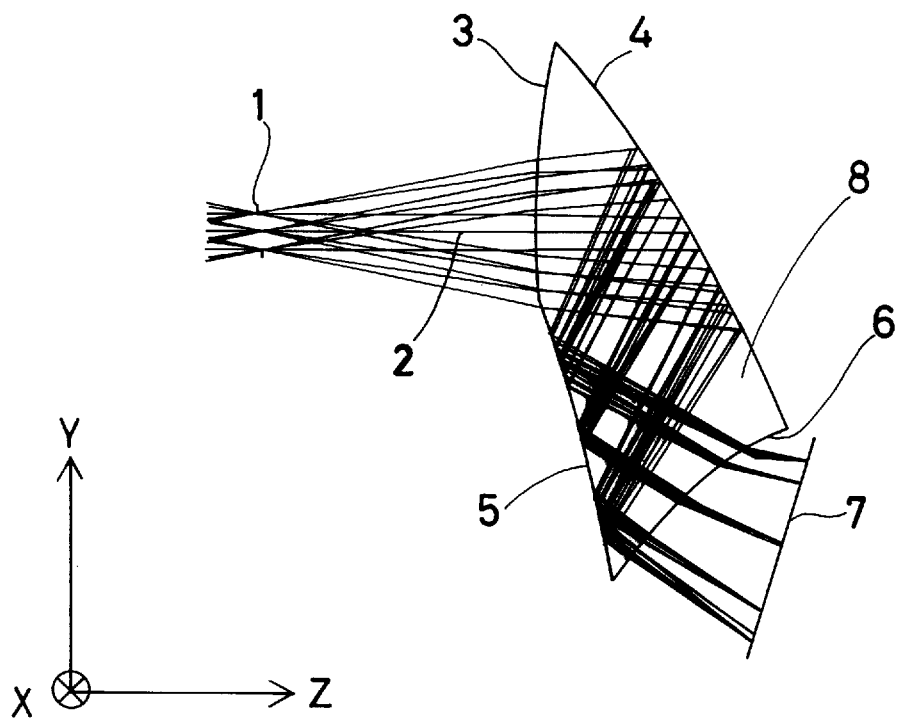
FIG. 1 illustrates an optical ray trace of Example 1 of an image display apparatus according to the present invention.

Constituent parameters of each example will be shown later. In the following description, the surface numbers are shown as ordinal numbers in backward tracing from an observer's pupil position 1 toward an image display device 7. A coordinate system is defined as follows: As shown in FIG. 1, with the observer's iris position 1 defined as the origin, the direction of an observer's visual axis 2 is taken as the Z-axis, where the direction toward an ocular optical system from the origin is defined as the positive direction, and the vertical direction (as viewed from the observer's eyeball) which perpendicularly intersects the observer's visual axis 2 is taken as the Y-axis, where the upward direction is defined as the position direction. Further, the horizontal direction (as viewed from the observer's eyeball) which perpendicularly intersects the observer's visual axis 2 is taken as the X-axis, where the leftward direction is defined as the positive direction. That is, the plane of the figure is defined as the YZ-plane, and a plane which is perpendicular to the plane of the figure is defined as the XZ-plane. The optical axis is bent in the YZ-plane, which is parallel to the plane of the figure.

In the constituent parameters (shown later), the surface separation, eccentricities Y and Z and inclination angle $\theta$ will be explained for each of the Examples shown below because the way in which references are given differs among Examples. Regarding the inclination angle $\theta$, it is positive when the rotation is counterclockwise.

In all Examples, the eccentricity Y of the surface of the image display device 7 is a distance by which the surface decenters in the Y-axis direction from the center of the observer's pupil 1, and the eccentricity Z of the surface of the image display device 7 is a distance by which the surface decenters in the Z-axis direction from the center of the observer's pupil 1. The inclination angle $\theta$ of the surface of the image display device 7 is the angle of inclination relative to the visual axis (Z-axis).

The non-rotationally symmetric aspherical configuration of each surface may be expressed in the coordinate system defining the surface as follows:

$$Z=[(X^2/R_x)+(Y^2/R_y)]/[1+\{1(1+K_x)(X^2/R_x^2)-(1+K_y)(Y^2/R_y^2)\}^{1/2}]+AR[(1-AP)X^2+(1+AP)Y^2]^2+BR[(1-BP)X^2+(1+BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

The rotationally symmetric aspherical configuration of each surface may be expressed by.

$$Z=[(h^2/R)/[1+\{1-(1+K)(h^2/R^2)\}^{1/2}]+Ah^4+Bh^6$$

where R is the paraxial curvature radius; K is the conical coefficient; A and B are 4th- and 6th-order aspherical coefficients, respectively; and h is given by $h^2=X^2+Y^2$.

It should be noted that the refractive index of the medium between a pair of adjacent surfaces is expressed by the refractive index for the spectral d-line. Lengths are given in millimeters.

The following examples are all image display apparatuses for the right eye. An image display apparatus for the left eye can be realized by disposing the constituent optical elements of each example in symmetrical relation to the apparatus for the right eye with respect to the YZ-plane.

In an actual apparatus, needless to say, the direction in which the optical axis is bent by the ocular optical system may be any of the upward, downward and sideward directions of the observer.

In each sectional view, reference numeral 1 denotes an observer's pupil position, 2 an observer's visual axis, 3 a first surface of an ocular optical system, 4 a second surface of the ocular optical system, 5 a third surface of the ocular optical system, 6 a fourth surface of the ocular optical system, 7 an image display device, 9 a decentered optical element, 10 an optical surface, 11 a negative lens, 12 a positive lens, 13 a cemented lens, and 14 a back-coated mirror.

The actual path of light rays in each example is as follows: In Example 1, for instance, a bundle of light rays emitted from the image display device 7 enters the ocular optical system (decentered optical element) while being refracted by the fourth surface 6 of the ocular optical system and is successively reflected by the third and second surfaces 5 and 4 of the ocular optical system. Then, the ray bundle is refracted by the first surface 3 of the ocular optical system so as to be projected into the observer's eyeball with the observer's iris position or eyeball rolling center as the exit pupil 1.

EXAMPLE 1

In this example, as shown in the sectional view of FIG. 1, the horizontal field angle is 30°, while the vertical field angle is 22.7°, and the pupil diameter is 4 millimeters.

In the constituent parameters (shown later), the surface number (hereinafter referred to as No.) 2 is given a surface separation, which is the distance from the center of the surface No. 1 (pupil 1) to the vertex of the surface No. 2 in a direction parallel to the visual axis 2. The surface No. 3 is given a surface separation and an inclination angle $\theta$. The separation is the distance from the vertex of the surface No. 2 to the vertex of the surface No. 3 in a direction parallel to the visual axis 2. The inclination angle $\theta$ is the inclination of the surface No. 3 relative to the visual axis 2. The surface No. 4 is given a surface separation, an eccentricity Y in the direction Y, and an inclination angle $\theta$. The separation is the distance from the vertex of the surface No. 3 to the vertex of the surface No. 4 in a direction parallel to the visual axis 2. The eccentricity Y is a distance by which the vertex of the surface No. 4 decenters in the Y-axis direction from the visual axis 2. The inclination angle $\theta$ is the inclination of the surface No. 4 relative to the visual axis 2. The surface No. 5 is given a surface separation, an eccentricity Y in the direction Y, and an inclination angle $\theta$. The separation is the distance from the vertex of the surface No. 4 to the vertex of the surface No. 5 in a direction parallel to the visual axis 2. The eccentricity Y is a distance by which the vertex of the surface No. 5 decenters in the Y-axis direction from the visual axis 2. The inclination angle $\theta$ is the inclination of the surface No. 5 relative to the visual axis 2.

In this example, the surface Nos. 2, 4 and 5 are spherical surfaces, and the surface No. 3 is an anamorphic aspherical surface.

EXAMPLE 2

Figure 2:
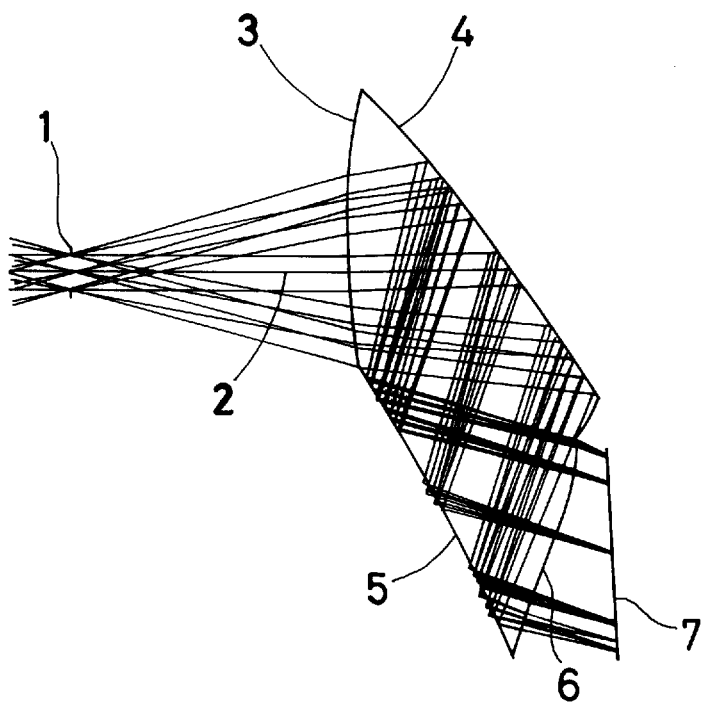
FIG. 2 illustrates an optical ray trace of Example 2 of an image display apparatus according to the present invention.

In this example, as shown in the sectional view of FIG. 2, the horizontal field angle is 40°, while the vertical field angle is 30.5°, and the pupil diameter is 4 millimeters.

In the constituent parameters (shown later), the surface No. 2 is given a surface separation, an eccentricity Y in the direction Y, and an inclination angle θ. The separation is the distance from the center of the surface No. 1 (pupil 1) to the vertex of the surface No. 2 in a direction parallel to the visual axis 2. The eccentricity Y is a distance by which the vertex of the surface No. 2 decenters in the Y-axis direction from the visual axis 2. The inclination angle θ is the inclination of the surface No. 2 relative to the visual axis 2. The surface Nos. 3, 4 and 5 are each given an eccentricity Y in the direction Y, an eccentricity Z in the direction Z, and an inclination angle θ. The eccentricity Y is a distance by which the vertex of each surface decenters in the Y-axis direction from the visual axis 2. The eccentricity Z is a distance by which the vertex of each surface decenters in the Z-axis direction from the vertex of the surface No. 2. The inclination angle θ is the inclination of each surface relative to the visual axis 2.

In this example, the surface No. 2 is a spherical surface, and the surface Nos. 3, 4 and 5 are anamorphic aspherical surfaces.

EXAMPLE 3

Figure 3:
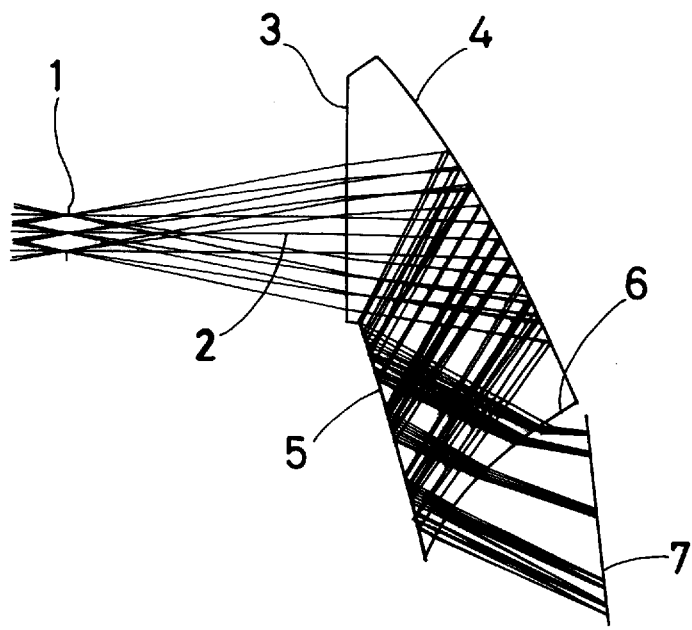
FIG. 3 illustrates an optical ray trace of Example 3 of an image display apparatus according to the present invention.

In this example, as shown in the sectional view of FIG. 3, the horizontal field angle is 30°, while the vertical field angle is 22.7°, and the pupil diameter is 4 millimeters.

The constituent parameters (shown later) are given in the same way as in Example 1.

In this example, the surface No. 2 is a plane surface, and the surface Nos. 4 and 5 are spherical surfaces. The surface No. 3 is an anamorphic aspherical surface.

EXAMPLE 4

Figure 4:
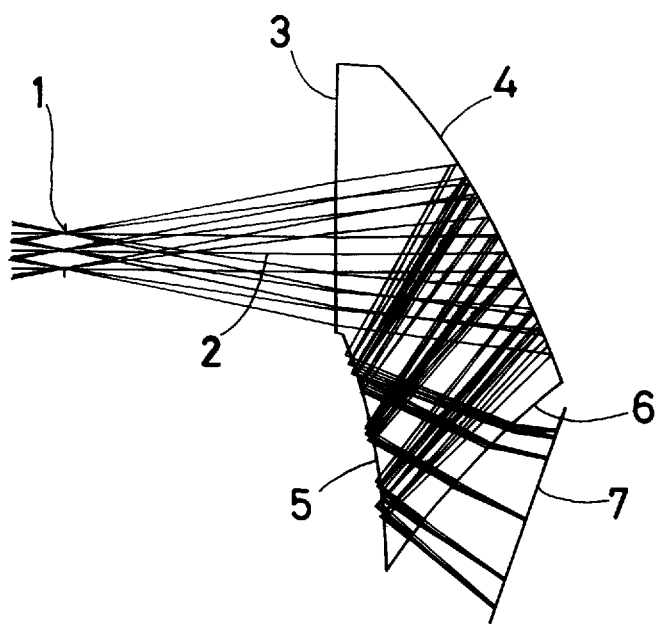
FIG. 4 illustrates an optical ray trace of Example 4 of an image display apparatus according to the present invention.

In this example, as shown in the sectional view of FIG. 4, the horizontal field angle is 30°, while the vertical field angle is 22.7°, and the pupil diameter is 4 millimeters.

In the constituent parameters (shown later), the surface No. 2 is given a surface separation, which is the distance from the center of the surface No. 1 (pupil 1) to the vertex of the surface No. 2 in a direction parallel to the visual axis 2. The surface No. 3 is given a surface separation, an eccentricity Y in the direction Y, and an inclination angle θ. The separation is the distance from the vertex of the surface No. 2 to the vertex of the surface No. 3 in a direction parallel to the visual axis 2. The eccentricity Y is a distance by which the vertex of the surface No. 3 decenters in the Y-axis direction from the visual axis 2. The inclination angle θ is the inclination of the surface No. 3 relative to the visual axis 2. The surface No. 4 is given a surface separation, an eccentricity Y in the direction Y, and an inclination angle θ. The separation is the distance from the vertex of the surface No. 3 to the vertex of the surface No. 4 in a direction parallel to the visual axis 2. The eccentricity Y is a distance by which the vertex of the surface No. 4 decenters in the Y-axis direction from the visual axis 2. The inclination angle θ is the inclination of the surface No. 4 relative to the visual axis 2. The surface No. 5 is given a surface separation, an eccentricity Y in the direction Y, and an inclination angle θ. The separation is the distance from the vertex of the surface No. 4 to the vertex of the surface No. 5 in a direction parallel to the visual axis 2. The eccentricity Y is a distance by which the vertex of the surface No. 5 decenters in the Y-axis direction from the visual axis 2. The inclination angle θ is the inclination of the surface No. 5 relative to the visual axis 2.

In this example, the surface Nos. 2 and 5 are spherical surfaces, and the surface Nos. 3 and 4 are anamorphic aspherical surfaces.

EXAMPLE 5

Figure 5:
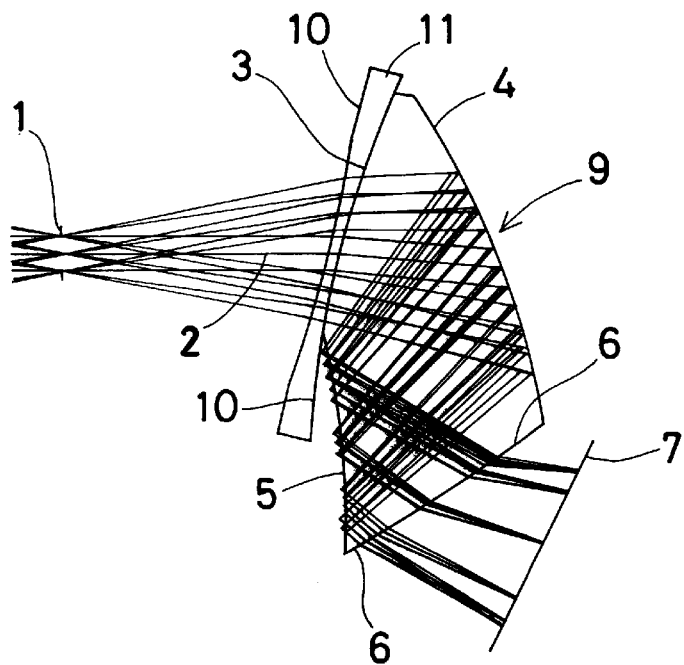
FIG. 5 illustrates an optical ray trace of Example 5 of an image display apparatus according to the present invention.

In this example, as shown in the sectional view of FIG. 5, the horizontal field angle is 30°, while the vertical field angle is 22.7°, and the pupil diameter is 4 millimeters.

In the constituent parameters (shown later), the surface No. 2 is given a surface separation and an inclination angle θ. The separation is the distance from the center of the surface No. 1 (pupil 1) to the vertex of the surface No. 2 in a direction parallel to the visual axis 2. The inclination angle θ is the inclination of the surface No. 2 relative to the visual axis 2. The surface No. 3 is given a surface separation, which is the distance between the surface Nos. 2 and 3 along the central axis of the surface No. 2. The surface No. 3 is coaxial with respect to the surface No. 2. The surface No. 4 is given a surface separation, an eccentricity Y in the direction Y, and an inclination angle θ. The separation is the distance from the vertex of the surface No. 3 to the vertex of the surface No. 4 in a direction parallel to the central axis of the surface No. 3. The eccentricity Y is a distance by which the vertex of the surface No. 4 decenters in a direction perpendicular to the central axis of the surface No. 2 (it is assumed that the coordinate system is rotated through the inclination angle θ at the surface No. 2). The inclination angle θ is the inclination of the surface No. 4 relative to the central axis of the surface No. 2. The surface No. 5 is given a surface separation, an eccentricity Y in the direction Y, and an inclination angle θ. The separation is the distance from the vertex of the surface No. 4 to the vertex of the surface No. 5 in a direction parallel to the central axis of the surface No. 2. The eccentricity Y is a distance by which the vertex of the surface No. 5 decenters in a direction perpendicular to the central axis of the surface No. 2. The inclination angle θ is the inclination of the surface No. 5 relative to the central axis of the surface No. 2. The surface No. 6 is given an eccentricity Y in the direction Y and an inclination angle θ. The eccentricity Y is a distance by which the vertex of the surface No. 6 decenters in a direction perpendicular to the central axis of the surface No. 2 from the vertex of the surface No. 5. The inclination angle θ is the inclination of the surface No. 6 relative to the central axis of the surface No. 2.

In this example, the surface Nos. 2, 3 and 6 are spherical surfaces, and the surface Nos. 4 and 5 are anamorphic aspherical surfaces. Further, a negative lens 11 is cemented to the first surface 3 of the decentered optical element 9 in such a manner as to be decentered with respect to the visual axis 2. The negative lens 11 comprises two optical surfaces 10, which are spherical surfaces.

EXAMPLE 6

Figure 6:
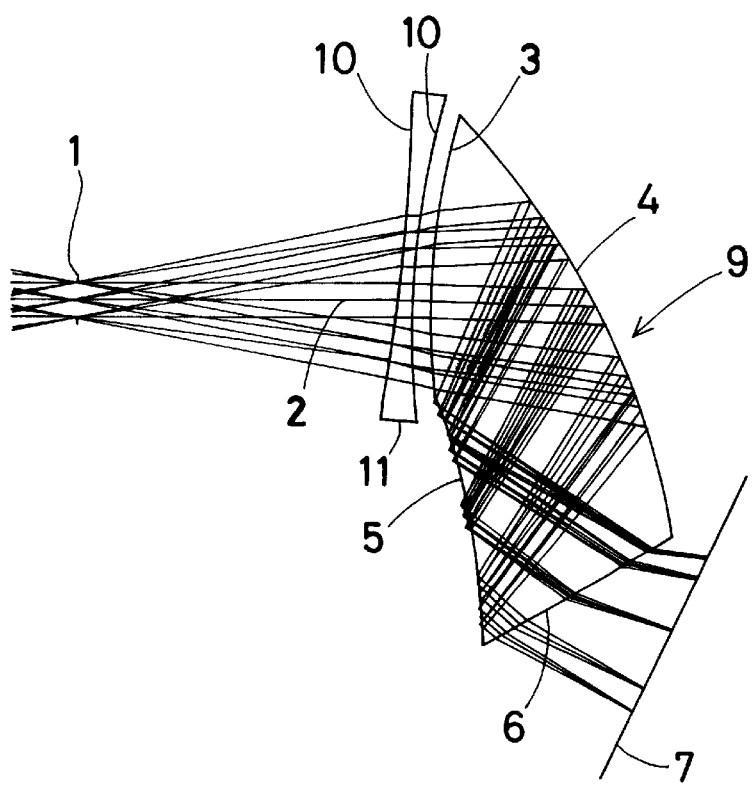
FIG. 6 illustrates an optical ray trace of Example 6 of an image display apparatus according to the present invention.

In this example, as shown in the sectional view of FIG. 6, the horizontal field angle is 30°, while the vertical field angle is 22.7°, and the pupil diameter is 4 millimeters.

In the constituent parameters (shown later), the surface No. 2 is given a surface separation, an eccentricity Y in the direction Y, and an inclination angle θ. The separation is the distance from the center of the surface No. 1 (pupil 1) to the vertex of the surface No. 2 in a direction parallel to the visual axis 2. The eccentricity Y is a distance by which the vertex of the surface No. 2 decenters in the Y-axis direction from the visual axis 2. The inclination angle θ is the inclination of the surface No. 2 relative to the visual axis 2. The surface No. 3 is given a surface separation, which is the distance between the surface Nos. 2 and 3 along the central axis of the surface No. 2. The surface No. 3 is coaxial with respect to the surface No. 2. The surface No. 4 is given a surface separation, an eccentricity Y in the direction Y, and an inclination angle θ. The separation is the distance from the vertex of the surface No. 3 to the vertex of the surface No. 4 in a direction parallel to the central axis of the surface No. 3. The eccentricity Y is a distance by which the vertex of the surface No. 4 decenters in a direction perpendicular to the central axis of the surface No. 2 (it is assumed that the coordinate system is rotated through the inclination angle θ at the surface No. 2). The inclination angle θ is the inclination of the surface No. 4 relative to the central axis of the surface No. 2. The surface Nos. 5, 6 and 7 are each given an eccentricity Y in the direction Y, an eccentricity Z in the direction Z, and an inclination angle θ. The eccentricity Y is a distance by which the vertex of each surface decenters in a direction perpendicular to the central axis of the surface No. 4 (it is assumed that the coordinate system is further rotated through the inclination angle θ at the surface No. 4). The eccentricity Z is a distance by which the vertex of each surface decenters in a direction parallel to the central axis of the surface No. 4 from the vertex of the surface No. 4. The inclination angle θ is the inclination of each surface relative to the central axis of the surface No. 4.

In this example, the surface Nos. 2, 3, 4 and 7 are spherical surfaces, and the surface Nos. 5 and 6 are anamorphic aspherical surfaces. Further, a negative lens 11 is disposed between the observer's pupil 1 and the first surface 3 of the decentered optical element 9 in such a manner as to be decentered with respect to the visual axis 2. The negative lens 11 comprises two optical surfaces 10, which are spherical surfaces.

EXAMPLE 7

Figure 7:
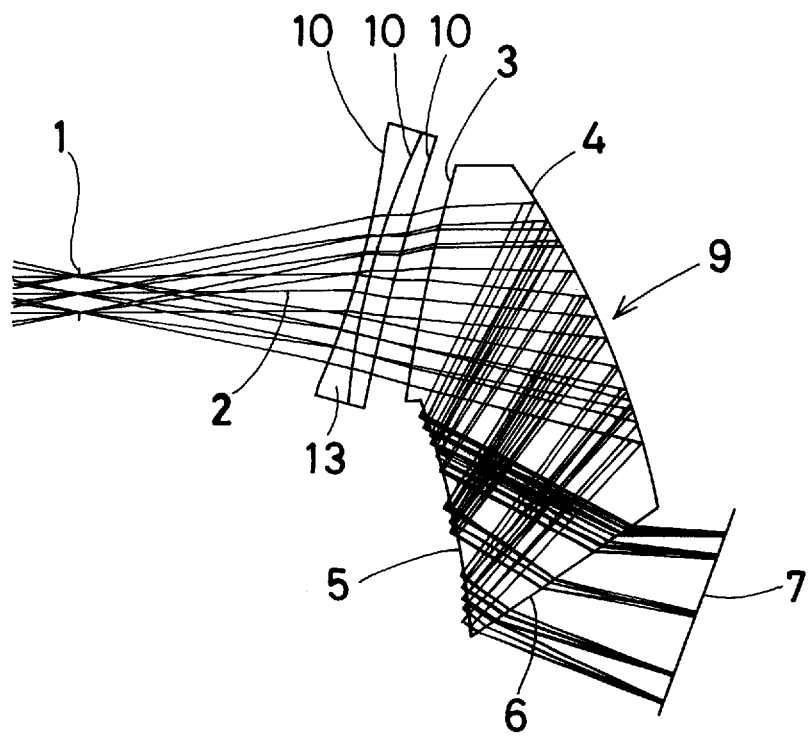
FIG. 7 illustrates an optical ray trace of Example 7 of an image display apparatus according to the present invention.

In this example, as shown in the sectional view of FIG. 7, the horizontal field angle is 30°, while the vertical field angle is 22.7°, and the pupil diameter is 4 millimeters.

In the constituent parameters (shown later), the surface No. 2 is given a surface separation, an eccentricity Y in the direction Y, and an inclination angle θ. The separation is the distance from the center of the surface No. 1 (pupil 1) to the vertex of the surface No. 2 in a direction parallel to the visual axis 2. The eccentricity Y is a distance by which the vertex of the surface No. 2 decenters in the Y-axis direction from the visual axis 2. The inclination angle θ is the inclination of the surface No. 2 relative to the visual axis 2. The surface No. 3 is given a surface separation, which is the distance between the surface Nos. 2 and 3 along the central axis of the surface No. 2. The surface No. 4 is also given a surface separation, which is the distance between the surface Nos. 3 and 4 along the central axis of the surface No. 2. Both the surface Nos. 3 and 4 are coaxial with respect to the surface No. 2. The surface Nos. 5, 6, 7 and 8 are each given an eccentricity Y in the direction Y, an eccentricity Z in the direction Z, and an inclination angle θ. The eccentricity Y is a distance by which the vertex of each surface decenters in the Y-axis direction from the visual axis 2. The eccentricity Z is a distance by which the vertex of each surface decenters in the Z-axis direction from the center of the surface No. 1. The inclination angle θ is the inclination of each surface relative to the visual axis 2.

In this example, the surface Nos. 2, 3, 4, 5 and 8 are spherical surfaces, and the surface Nos. 6 and 7 are anamorphic aspherical surfaces. Further, a negative cemented lens 13 is disposed between the observer's pupil 1 and the decentered optical element 9 in such a manner as to be decentered with respect to the visual axis 2. The negative cemented lens 13 comprises three optical surfaces 10, which are spherical surfaces.

EXAMPLE 8

Figure 8:
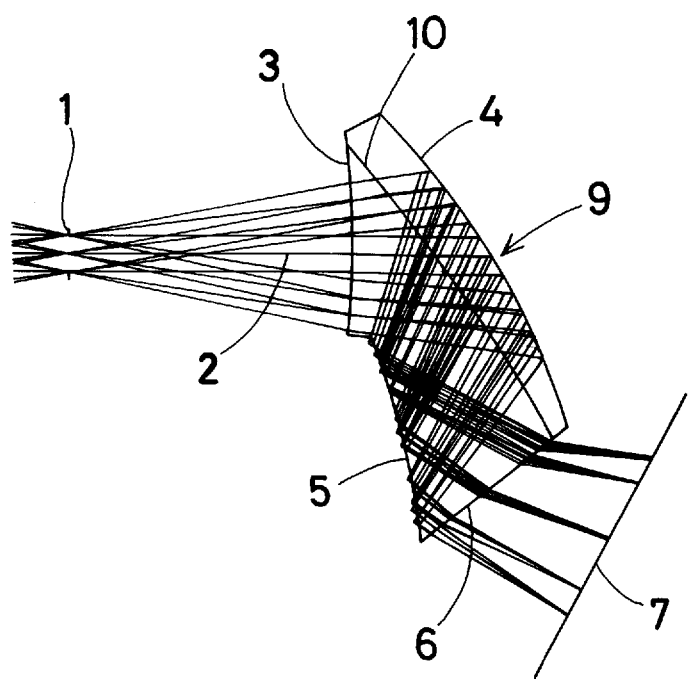
FIG. 8 illustrates an optical ray trace of Example 8 of an image display apparatus according to the present invention.

In this example, as shown in the sectional view of FIG. 8, the horizontal field angle is 30°, while the vertical field angle is 22.7°, and the pupil diameter is 4 millimeters.

In the constituent parameters (shown later), the surface No. 2 is given a surface separation, which is the distance from the center of the surface No. 1 (pupil 1) to the vertex of the surface No. 2 in a direction parallel to the visual axis 2. The surface Nos. 3, 4, 5, 6 and 7 are each given an eccentricity Y in the direction Y, an eccentricity Z in the direction Z, and an inclination angle θ. The eccentricity Y is a distance by which the vertex of each surface decenters in the Y-axis direction from the visual axis 2. The eccentricity Z is a distance by which each surface decenters in the Z-axis direction from the vertex of the surface No. 2. The inclination angle θ is the inclination of each surface relative to the visual axis 2.

In this example, the surface Nos. 2, 3, 5 and 7 are spherical surfaces, and the surface Nos. 4 and 6 are anamorphic aspherical surfaces. Further, one optical surface 10 is disposed between the first and second surfaces 3 and 4 of the decentered optical element 9 in such a manner as to be decentered with respect to the visual axis 2. The optical surface 10 is a spherical surface having a concave surface directed toward the pupil 1.

EXAMPLE 9

Figure 9:
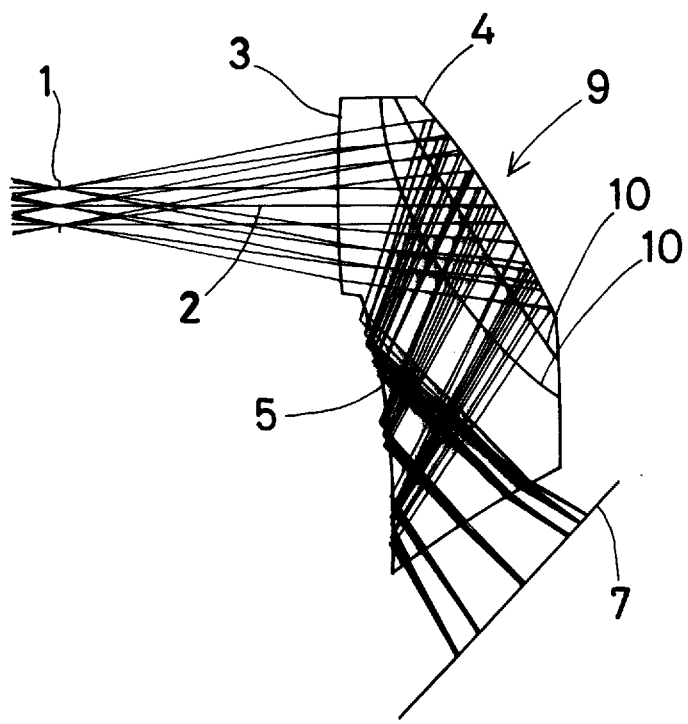
FIG. 9 illustrates an optical ray trace of Example 9 of an image display apparatus according to the present invention.

In this example, as shown in the sectional view of FIG. 9, the horizontal field angle is 30°, while the vertical field angle is 22.7°, and the pupil diameter is 4 millimeters.

In the constituent parameters (shown later), the surface No. 2 is given a surface separation, an eccentricity Y in the direction Y, and an inclination angle θ. The separation is the distance from the center of the surface No. 1 (pupil 1) to the vertex of the surface No. 2 in a direction parallel to the visual axis 2. The eccentricity Y in the direction Y is a distance by which the vertex of the surface No. 2 decenters in the Y-axis direction from the visual axis 2. The inclination angle θ is the inclination of the surface No. 2 relative to the visual axis 2. The surface Nos. 3, 4, 5, 6, 7, 8 and 9 are each given an eccentricity Y in the direction Y, an eccentricity Z in the direction Z, and an inclination angle θ. The eccentricity Y is a distance by which the vertex of each surface decenters in the Y-axis direction from the visual axis 2. The eccentricity Z is a distance by which each surface decenters in the Z-axis direction from the vertex of the surface No. 2. The inclination angle θ is the inclination of each surface relative to the visual axis 2.

In this example, the surface Nos. 3, 4, 6, 7 and 9 are spherical surfaces, and the surface No. 2 is a rotationally symmetric aspherical surface. The surface Nos. 5 and 8 are anamorphic aspherical surfaces. Further, two optical surfaces 10 are disposed between the first and second surfaces 3 and 4 of the decentered optical element 9 in such a manner as to be decentered with respect to the visual axis 2. Each optical surface 10 is a spherical surface having a convex surface directed toward the pupil 1.

EXAMPLE 10

Figure 10:
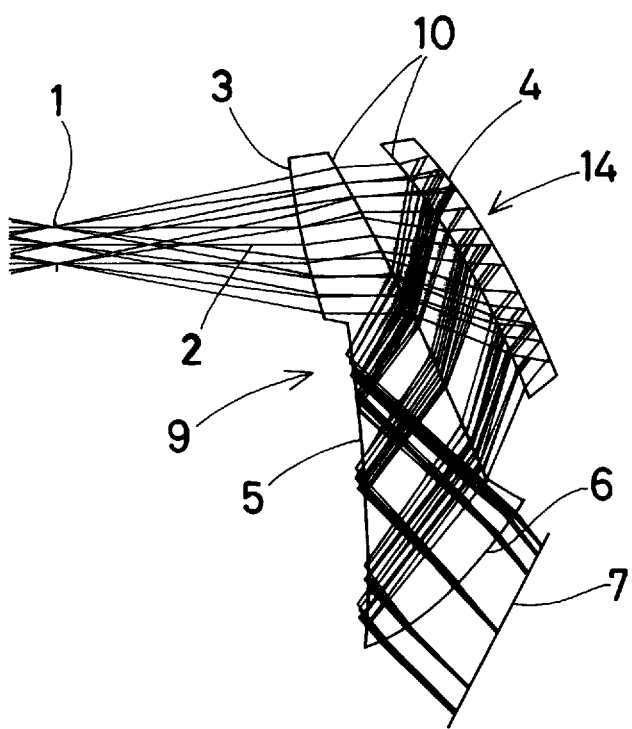
FIG. 10 illustrates an optical ray trace of Example 10 of an image display apparatus according to the present invention.

In this example, as shown in the sectional view of FIG. 10, the horizontal field angle is 30°, while the vertical field angle is 22.7°, and the pupil diameter is 4 millimeters.

The constituent parameters (shown later) are given in the same way as in Example 9.

In this example, the surface Nos. 3, 4, 6, 7 and 9 are spherical surfaces, and the surface No. 2 is a rotationally symmetric aspherical surface. The surface Nos. 5 and 8 are anamorphic aspherical surfaces. Further, a back-coated mirror 14 having a concave surface directed toward the pupil 1 is disposed at that side of the second surface of the decentered optical element 9 which is remote from the pupil 1 in such a manner that the mirror 14 is decentered with respect to the visual axis 2. The back-coated mirror 14 comprises an optical surface 10 which is a spherical surface having a concave surface directed toward the pupil 1, and an anamorphic aspherical surface. In this example, however, the second surface 14 of the decentered optical element 9 is substantially formed from the reflecting surface of the back-coated mirror 14.

EXAMPLE 11

Figure 11:
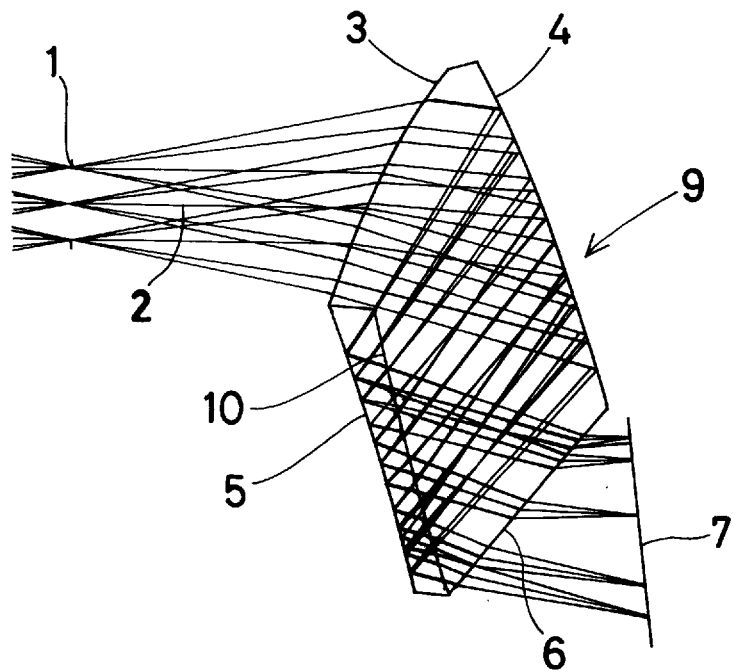
FIG. 11 illustrates an optical ray trace of Example 11 of an image display apparatus according to the present invention.

In this example, as shown in the sectional view of FIG. 11, the horizontal field angle is 30°, while the vertical field angle is 22.7°, and the pupil diameter is 8 millimeters.

In the constituent parameters (shown later), the surface No. 2 is given a surface separation, an eccentricity Y in the direction Y, and an inclination angle θ. The separation is the distance from the center of the surface No. 1 (pupil 1) to the vertex of the surface No. 2 in a direction parallel to the visual axis 2. The eccentricity Y is a distance by which the vertex of the surface No. 2 decenters in the Y-axis direction from the visual axis 2. The inclination angle θ is the inclination of the surface No. 2 relative to the visual axis 2. The surface Nos. 3, 4, 5, 6 and 7 are each given an eccentricity Y in the direction Y, an eccentricity Z in the direction Z, and an inclination angle θ. The eccentricity Y is a distance by which the vertex of each surface decenters in a direction perpendicular to the central axis of the surface No. 2 (it is assumed that the coordinate system is rotated through the inclination angle θ at the surface No. 2). The eccentricity Z is a distance by which the vertex of each surface decenters in a direction parallel to the central axis of the surface No. 2 from the vertex of the surface No. 2. The inclination angle θ is the inclination of each surface relative to the central axis of the surface No. 2.

In this example, the surface Nos. 2, 4, 5, 6 and 7 are spherical surfaces, and the surface No. 3 is an anamorphic aspherical surface. Further, one optical surface 10 is disposed between the second and third surfaces 4 and 5 of the decentered optical element 9 in such a manner as to be decentered with respect to the visual axis 2. The optical surface 10 is a spherical surface having a convex surface directed toward the pupil 1.

EXAMPLE 12

Figure 12:
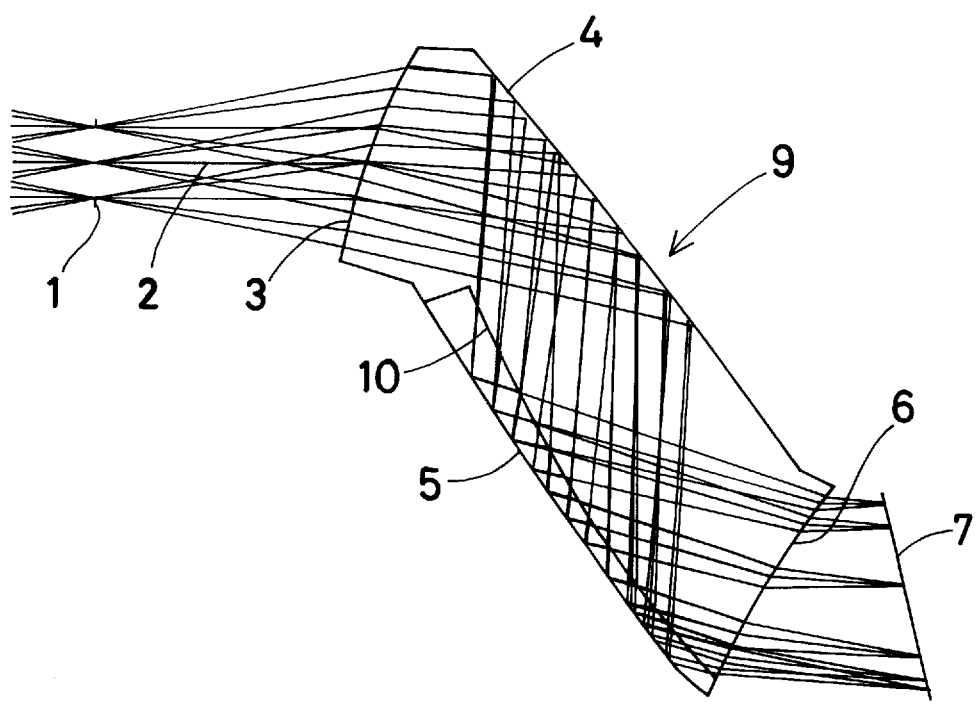
FIG. 12 illustrates an optical ray trace of Example 12 of an image display apparatus according to the present invention.

In this example, as shown in the sectional view of FIG. 12, the horizontal field angle is 30°, while the vertical field angle is 22.7°, and the pupil diameter is 8 millimeters.

The constituent parameters (shown later) are given in the same way as in Example 11.

In this example, the surface Nos. 2, 4, 5, 6 and 7 are spherical surfaces, and the surface No. 3 is an anamorphic aspherical surface. Further, one optical surface 10 is disposed between the second and third surfaces 4 and 5 of the decentered optical element 9 in such a manner as to be decentered with respect to the visual axis 2. The optical surface 10 is a spherical surface having a convex surface directed toward the pupil 1. The surface Nos. 3 and 5 in the constituent parameters are reflecting surfaces, both of which are arranged such that total reflection can be utilized.

EXAMPLE 13

Figure 13:
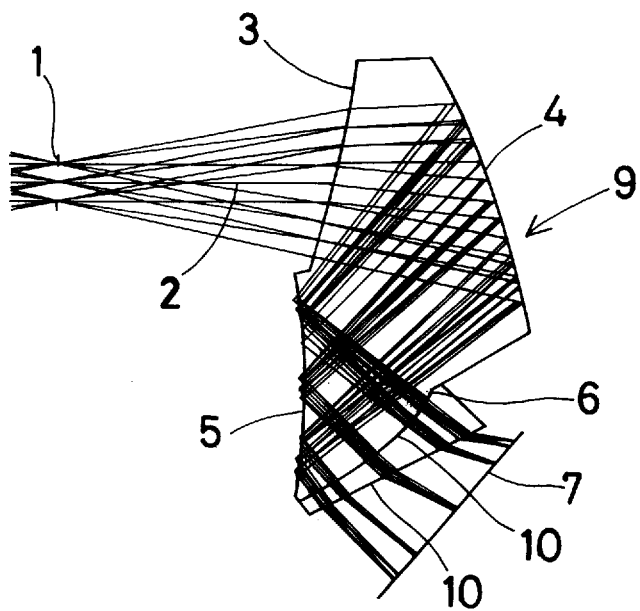
FIG. 13 illustrates an optical ray trace of Example 13 of an image display apparatus according to the present invention.

In this example, as shown in the sectional view of FIG. 13, the horizontal field angle is 30°, while the vertical field angle is 22.7°, and the pupil diameter is 4 millimeters.

In the constituent parameters (shown later), the surface No. 2 is given a surface separation and an inclination angle θ. The separation is the distance from the center of the surface No. 1 (pupil 1) to the vertex of the surface No. 2 in a direction parallel to the visual axis 2. The inclination angle θ is the inclination of the surface No. 2 relative to the visual axis 2. The surface No. 3 is given a surface separation, an eccentricity Y in the direction Y, and an inclination angle θ. The separation is the distance from the vertex of the surface No. 2 to the vertex of the surface No. 3 in a direction parallel to the central axis of the surface No. 2. The eccentricity Y is a distance by which the vertex of the surface No. 3 decenters in a direction perpendicular to the central axis of the surface No. 2 (it is assumed that the coordinate system is rotated through the inclination angle θ at the surface No. 2). The inclination angle θ is the inclination of the surface No. 3 relative to the central axis of the surface No. 2. The surface No. 4 is given a surface separation, an eccentricity Y in the direction Y, and an inclination angle θ. The separation is the distance from the vertex of the surface No. 3 to the vertex of the surface No. 4 in a direction parallel to the central axis of the surface No. 2. The eccentricity Y is a distance by which the vertex of the surface No. 4 decenters in a direction perpendicular to the central axis of the surface No. 2. The inclination angle θ is the inclination of the surface No. 4 relative to the central axis of the surface No. 2. The surface No. 5 is given a surface separation, an eccentricity Y in the direction Y, and an inclination angle θ. The separation is the distance from the vertex of the surface No. 4 to the vertex of the surface No. 5 in a direction parallel to the central axis of the surface No. 2. The eccentricity Y is a distance by which the vertex of the surface No. 5 decenters in a direction perpendicular to the central axis of the surface No. 2. The inclination angle θ is the inclination of the surface No. 5 relative to the central axis of the surface No. 2. The surface No. 6 is given a surface separation, which is the distance between the surface Nos. 5 and 6 along the central axis of the surface No. 5. The surface No. 6 is coaxial with respect to the surface No. 5.

In this example, the surface Nos. 2, 5 and 6 are spherical surfaces, and the surface Nos. 3 and 4 are anamorphic aspherical surfaces. Further, a negative lens 11 is cemented to the fourth surface 6 of the decentered optical element 9 in such a manner as to be decentered with respect to the visual axis 2. The negative lens 11 comprises two optical surfaces 10, which are spherical surfaces.

EXAMPLE 14

Figure 14:
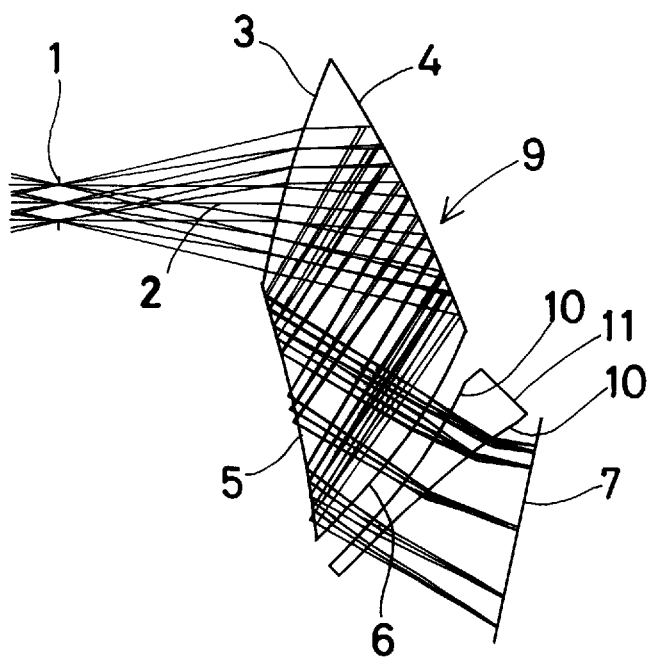
FIG. 14 illustrates an optical ray trace of Example 14 of an image display apparatus according to the present invention.

In this example, as shown in the sectional view of FIG. 14, the horizontal field angle is 35°, while the vertical field angle is 26.6°, and the pupil diameter is 4 millimeters.

In the constituent parameters (shown later), the surface No. 2 is given a surface separation and an inclination angle θ. The separation is the distance from the center of the surface No. 1 (pupil 1) to the vertex of the surface No. 2 in a direction parallel to the visual axis 2. The inclination angle θ is the inclination of the surface No. 2 relative to the visual axis 2. The surface Nos. 3, 4, 5 and 6 are each given an eccentricity Y in the direction Y, an eccentricity Z in the direction Z, and an inclination angle θ. The eccentricity Y is a distance by which the vertex of each surface decenters in the Y-axis direction from the visual axis 2. The eccentricity Z is a distance by which the vertex of each surface decenters in the Z-axis direction from the vertex of the surface No. 2. The inclination angle θ is the inclination of each surface relative to the visual axis 2. The surface No. 7 is given a surface separation, which is the distance between the surface Nos. 6 and 7 along the central axis of the surface No. 6. The surface No. 7 is coaxial with respect to the surface No. 6.

In this example, the surface Nos. 2, 5, 6 and 7 are spherical surfaces, and the surface Nos. 3 and 4 are anamorphic aspherical surfaces. Further, a negative lens 11 is disposed between the fourth surface 6 of the decentered optical element 9 and the image display device 7 in such a manner as to be decentered with respect to the visual axis 2. The negative lens 11 comprises two optical surfaces 10, which are spherical surfaces.

EXAMPLE 15

Figure 15:
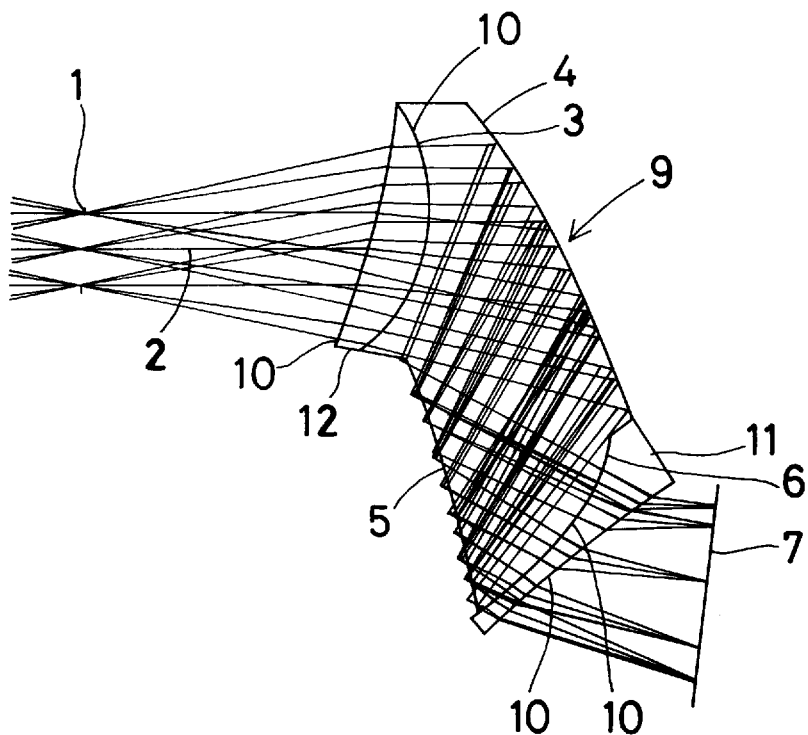
FIG. 15 illustrates an optical ray trace of Example 15 of an image display apparatus according to the present invention.

In this example, as shown in the sectional view of FIG. 15, the horizontal field angle is 30°, while the vertical field angle is 22.7°, and the pupil diameter is 4 millimeters.

In the constituent parameters (shown later), the surface No. 2 is given a surface separation, an eccentricity Y in the direction Y, and an inclination angle θ. The separation is the distance from the center of the surface No. 1 (pupil 1) to the vertex of the surface No. 2 in a direction parallel to the visual axis 2. The eccentricity Y is a distance by which the surface No. 2 decenters in the Y-axis direction from the visual axis 2. The inclination angle θ is the inclination of the surface No. 2 relative to the visual axis 2. The surface No. 3 is given a surface separation, which is the distance between the surface Nos. 2 and 3 along the central axis of the surface No. 2. The surface No. 3 is coaxial with respect to the surface No. 2. The surface No. 4 is given a surface separation, an eccentricity Y in the direction Y, and an inclination angle θ. The separation is the distance from the vertex of the surface No. 3 to the vertex of the surface No. 4 in a direction parallel to the central axis of the surface No. 3. The eccentricity Y is a distance by which the vertex of the surface No. 4 decenters in a direction perpendicular to the central axis of the surface No. 2 (it is assumed that the coordinate system is rotated through the inclination angle θ at the surface No. 2). The inclination angle θ is the inclination of the surface No. 4 relative to the central axis of the surface No. 2. The surface No. 5 is given a surface separation, an eccentricity Y in the direction Y, and an inclination angle θ. The separation is the distance from the vertex of the surface No. 4 to the vertex of the surface No. 5 in a direction parallel to the central axis of the surface No. 2. The eccentricity Y is a distance by which the vertex of the surface No. 5 decenters in a direction perpendicular to the central axis of the surface No. 2. The inclination angle θ is the inclination of the surface No. 5 relative to the central axis of the surface No. 2. The surface No. 6 is given an eccentricity Y in the direction Y and an inclination angle θ. The eccentricity Y is a distance by which the vertex of the surface No. 6 decenters in a direction perpendicular to the central axis of the surface No. 2 from the vertex of the surface No. 5. The inclination angle θ is the inclination of the surface No. 6 relative to the central axis of the surface No. 2. The surface No. 7 is given a surface separation, which is the distance between the surface Nos. 6 and 7 along the central axis of the surface No. 6. The surface No. 7 is coaxial with respect to the surface No. 6.

In this example, the surface Nos. 2, 3, 6 and 7 are spherical surfaces, and the surface Nos. 4 and 5 are anamorphic aspherical surfaces. Further, a positive lens 12 is cemented to the first surface 3 of the decentered optical element 9 in such a manner as to be decentered with respect to the visual axis 2. The positive lens 12 comprises two optical surfaces 10, which are spherical surfaces. In addition, a negative lens 11 is cemented to the fourth surface 6 of the decentered optical element 9 in such a manner as to be decentered with respect to the visual axis 2. The negative lens 11 comprises two optical surfaces 10, which are spherical surfaces.

EXAMPLE 16

Figure 16:
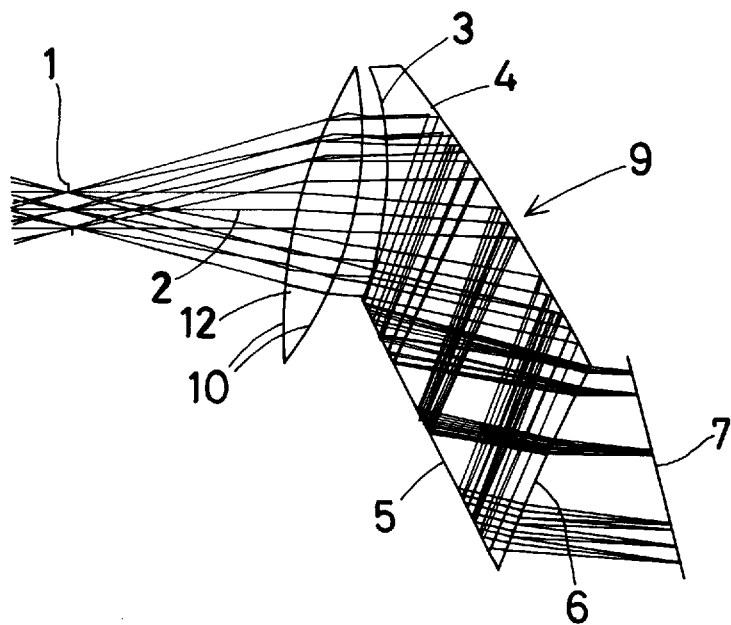
FIG. 16 illustrates an optical ray trace of Example 16 of an image display apparatus according to the present invention.

In this example, as shown in the sectional view of FIG. 16, the horizontal field angle is 40°, while the vertical field angle is 30.6°, and the pupil diameter is 4 millimeters.

In the constituent parameters (shown later), the surface No. 2 is given a surface separation, an eccentricity Y in the direction Y, and an inclination angle θ. The separation is the distance from the center of the surface No. 1 (pupil 1) to the vertex of the surface No. 2 in a direction parallel to the visual axis 2. The eccentricity Y is a distance by which the vertex of the surface No. 2 decenters in the Y-axis direction from the visual axis 2. The inclination angle θ is the inclination of the surface No. 2 relative to the visual axis 2. The surface No. 3 is given a surface separation, which is the distance between the surface Nos. 2 and 3 along the central axis of the surface No. 2. The surface No. 3 is coaxial with respect to the surface No. 2. The surface Nos. 4, 5, 6 and 7 are each given an eccentricity Y in the direction Y, an eccentricity Z in the direction Z, and an inclination angle θ. The eccentricity Y is a distance by which the vertex of each surface decenters in the Y-axis direction from the visual axis 2. The eccentricity Z is a distance by which the vertex of each surface decenters in the Z-axis direction from the center of the surface No. 1. The inclination angle α is the inclination of each surface relative to the visual axis 2.

In this example, the surface Nos. 2, 3, 4 and 7 are spherical surfaces, and the surface Nos. 5 and 6 are anamorphic aspherical surfaces. Further, a positive lens 12 is disposed between the observer's pupil 1 and the first surface 3 of the decentered optical element 9 in such a manner as to be decentered with respect to the visual axis 2. The positive lens 12 comprises two optical surfaces 10, which are aspherical and spherical surfaces, respectively.

EXAMPLE 17

Figure 17:
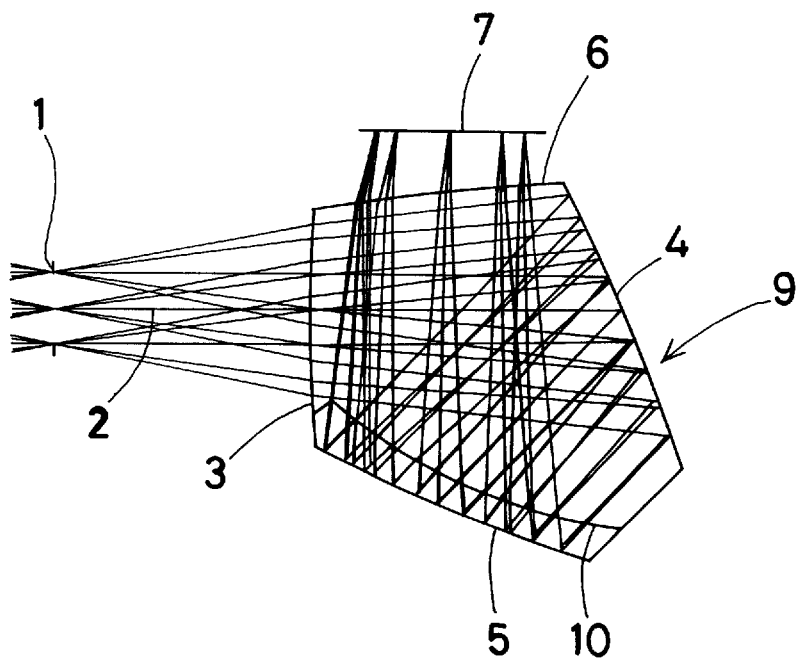
FIG. 17 illustrates an optical ray trace of Example 17 of an image display apparatus according to the present invention.

In this example, as shown in the sectional view of FIG. 17, the horizontal field angle is 30°, while the vertical field angle is 22.7°, and the pupil diameter is 8 millimeters.

In the constituent parameters (shown later), the surface No. 2 is given a surface separation, which is the distance from the center of the surface No. 1 (pupil 1) to the vertex of the surface No. 2 in a direction parallel to the visual axis 2. The surface Nos. 3, 4, 5 and 6 are each given an eccentricity Y in the direction Y, an eccentricity Z in the direction Z, and an inclination angle θ. The eccentricity Y is a distance by which the vertex of each surface decenters in the Y-axis direction from the visual axis 2. The eccentricity Z is a distance by which the vertex of each surface decenters in the Z-axis direction from the vertex of the surface No. 2. The inclination angle α is the inclination of each surface relative to the visual axis 2.

In this example, the surface Nos. 2, 3, 4, 6 and 7 are spherical surfaces, and the surface No. 5 is an anamorphic aspherical surface. Further, an optical surface 10, which is a spherical surface, is disposed between the second and third surfaces 4 and 5 of the decentered optical element 9 in such a manner as to be decentered with respect to the visual axis 2.

The constituent parameters in the above-described Examples 1 to 17 are as follows:

Example 1

| Surface No. | Radius of curvature | Surface separation | Refractive index (Eccentricity) | Abbe's No. (Inclination angle) |
|---|---|---|---|---|
| 1 | ∞(pupil) | 32.000 | | |
| 2 | 97.497 | 18.000 | 1.5163 | 64.15 |
| 3 | $R_y$ −136.507<br>$R_x$ −110.230<br>$K_y$ −8.368527<br>$K_x$ −4.172733<br>AR −1.59481 × 10$^{-7}$<br>BR 2.66293 × 10$^{-20}$<br>AP 0.21126<br>BP 2.19465 > 10$^3$ | −16.000 | 1.5163 | 64.15<br>θ 31.00° |
| 4 | −207.825 | 13.000 | 1.5163<br>Y −12.000 | 64.15<br>θ 18.37° |
| 5 | 47.941 | | Y −32.393 | θ −43.79° |
| 6 | (display device) | | Y −35.719<br>Z 60.318 | θ 16.65° |
| (1) | $R_{y3}/R_{y2}$ = 1.522 | | | |
| (2) | $R_{y2}/R_{x2}$ = 1.238 | | | |
| (3) | α = 59° | | | |

Example 2

| Surface No. | Radius of curvature | Surface separation | Refractive index (Eccentricity) | Abbe's No. (Inclination angle) |
|---|---|---|---|---|
| 1 | ∞(pupil) | 32.522 | | |
| 2 | 76.063 | | 1.4990<br>Y −0.946 | 69.10<br>θ 2.91° |
| 3 | $R_y$ −156.527<br>$R_x$ −98.656<br>$K_y$ −7.073431<br>$K_x$ −4.186291<br>AR 6.03173 × 10$^{-11}$<br>BR −3.111158 × 10$^{-21}$<br>AP −40.1178<br>BP 1.57973 × 10$^3$ | | 1.4990<br>Y 2.234<br>Z 17.139 | 69.10<br>θ 36.99° |
| 4 | $R_y$ −392.753<br>$R_x$ −124.880<br>$K_y$ 26.603285<br>$K_x$ −2.904214<br>AR −6.08108 × 10$^{-8}$<br>BR 8.10913 × 10$^{-11}$<br>AP 0.0130633<br>BP 0.280287 | | 1.4990<br>Y −9.745<br>Z 0.739 | 69.10<br>θ 29.83° |
| 5 | $R_y$ 133.797<br>$R_x$ 898.615<br>$K_y$ −41.405219<br>$K_x$ −22.762024<br>AR −8.61315 × 10$^{-6}$<br>BR −1.1141 × 10$^{-9}$<br>AP −0.610618<br>BP 1.40395 | | Y −40.684<br>Z 19.597 | θ −19.13° |
| 6 | (display device) | | Y −32.358<br>Z 62.534 | θ 2.87° |
| (1) | $R_{y3}/R_{y2}$ = 2.509 | | | |
| (2) | $R_{y2}/R_{x2}$ = 1.587 | | | |
| (3) | α = 53.01° | | | |

Example 3

| Surface No. | Radius of curvature | Surface separation | Refractive index (Eccentricity) | Abbe's No. (Inclination angle) |
|---|---|---|---|---|
| 1 | ∞(pupil) | 32.000 | | |
| 2 | ∞ | 18.000 | 1.5163 | 64.15 |
| 3 | $R_y$ −115.406<br>$R_x$ −88.703<br>$K_y$ −2.807444<br>$K_x$ −0.873733<br>AR −3.66094 × 10$^{-8}$<br>BR 2.09121 × 10$^{-14}$<br>AP 1.20229<br>AR 24.6366 | −16.000 | 1.5163 | 64.15<br>θ 30.00° |
| 4 | −430.703 | 13.000 | 1.5163<br>Y −11.315 | 64.15<br>θ 18.37° |
| 5 | 30.780 | | Y −27.507 | θ −39.28° |
| 6 | (display device) | | Y −31.522 | θ 7.17° |
| (1) | $R_{y3}/R_{y2}$ = 3.732 | | | |
| (2) | $R_{y2}/R_{x2}$ = 1.301 | | | |
| (3) | α = 60° | | | |

Example 4

| Surface No. | Radius of curvature | Surface separation | Refractive index (Eccentricity) | Abbe's No. (Inclination angle) |
|---|---|---|---|---|
| 1 | ∞(pupil) | 32.000 | | |
| 2 | −2227.303 | 18.000 | 1.4870 | 70.40 |
| 3 | $R_y$ −86.054<br>$R_x$ −71.847<br>$K_y$ −0.893441<br>$K_x$ −0.204808<br>AR −3.32767 × 10$^{-3}$<br>BR −3.29557 × 10$^{-11}$<br>AP 0.262425<br>AR 0.671931 | −16.000 | 1.4870<br>Y 3.478 | 70.40<br>θ 29.21° |
| 4 | $R_y$ −70.490<br>$R_x$ −52.620<br>$K_y$ 0<br>$K_x$ 0<br>AR −7.62513 × 10$^{-8}$<br>BR −2.27777 × 10$^{-10}$<br>AP −1.60098<br>AR −1.58374 | 6.966 | 1.4870<br>Y −13.000 | 70.40<br>θ 18.37° |
| 5 | 85.106 | | Y −32.132 | θ −34.75° |
| 6 | (display device) | | Y −30.195<br>Z 53.755 | θ −19.83° |
| (1) | $R_{y3}/R_{y2}$ = 0.819 | | | |
| (2) | $R_{y2}/R_{x2}$ = 1.198 | | | |
| (3) | α = 60.79° | | | |

Example 5

| Surface No. | Radius of curvature | Surface separation | Refractive index (Eccentricity) | Abbe's No. (Inclination angle) |
|---|---|---|---|---|
| 1 | ∞ (pupil) | 32.000 | | |
| 2 | −134.369 | 1.161 | 1.70354 | 30.03<br>θ −14.22° |
| 3 | 111.981 | 19.000 | 1.70246 | 48.40 |
| 4 | $R_y$ −97.955<br>$R_x$ −77.443<br>$K_y$ −2.387132<br>$K_x$ −1.550973<br>AR −6.04843 × 10$^{-7}$<br>BR −5.9898 × 10$^{-11}$<br>AP −0.113321<br>BP −0.375991 | −17.000 | 1.70246<br>Y 3.478 | 48.40<br>θ 35.00° |
| 5 | $R_y$ −109.614<br>$R_x$ −72.524 | | 1.70246<br>Y −13.000 | 48.40<br>θ 25.00° |

Example 5

| Surface No. | Radius of curvature | Surface separation | Refractive index (Eccentricity) | Abbe's No. (Inclination angle) |
|---|---|---|---|---|
| | $K_y$ 0 | | | |
| | $K_x$ 0 | | | |
| | AR $-1.25361 \times 10^{-6}$ | | | |
| | BR $-2.36014 \times 10^{-10}$ | | | |
| | AP $-0.41305$ | | | |
| | BP $-0.506152$ | | | |
| 6 | $-360.157$ | | Y $-41.654$ | θ $-46.70°$ |
| 7 | (display device) | | Y $-34.523$ | θ $-27.39°$ |
| (1) | $R_{y3}/R_{y2} = 1.119$ | | | |
| (2) | $R_{y2}/R_{x2} = 1.265$ | | | |
| (3) | $\alpha = 69.22°$ | | | |

Example 6

| Surface No. | Radius of curvature | Surface separation | Refractive index (Eccentricity) | Abbe's No. (Inclination angle) |
|---|---|---|---|---|
| 1 | ∞ (pupil) | 39.024 | | |
| 2 | $-480.180$ | 1.627 | 1.7550 | 27.60 |
| | | | Y 5.087 | θ $-5.57°$ |
| 3 | 94.723 | 1.990 | | |
| 4 | 77.191 | | 1.6554 | 54.18 |
| | | | Y $-2.109$ | θ $1.81°$ |
| 5 | $R_y$ $-118.749$ | | 1.6554 | 54.18 |
| | $R_x$ $-86.271$ | | Y 10.000 | θ $39.42°$ |
| | $K_y$ $-8.00636$ | | Z 111.291 | |
| | $K_x$ $-3.682175$ | | | |
| | AR $-5.67283 \times 10^{-7}$ | | | |
| | BR $4.77872 \times 10^{-11}$ | | | |
| | AP $-0.0390653$ | | | |
| | BP $-0.229718$ | | | |
| 6 | $R_y$ $-149.417$ | | 1.6554 | 54.18 |
| | $R_x$ $-81.023$ | | Y $-16.389$ | θ $20.00°$ |
| | $K_y$ 0 | | Z 2.860 | |
| | $K_x$ 0 | | | |
| | AR $-1.11451 \times 10^{-7}$ | | | |
| | BR $-4.01175 \times 10^{-10}$ | | | |
| | AP $-0.409334$ | | | |
| | BP $-0.0471411$ | | | |
| 7 | 416.536 | | Y $-44.775$ | θ $-54.20°$ |
| | | | Z 7.818 | |
| 8 | (display device) | | Y $-39.406$ | θ $-26.59°$ |
| | | | Z 71.676 | |
| (1) | $R_{y3}/R_{y2} = 1.258$ | | | |
| (2) | $R_{y2}/R_{x2} = 1.376$ | | | |
| (3) | $\beta = 54.34°$ | | | |

Example 7

| Surface No. | Radius of curvature | Surface separation | Refractive index (Eccentricity) | Abbe's No. (Inclination angle) |
|---|---|---|---|---|
| 1 | ∞ (pupil) | 32.888 | | |
| 2 | $-127.238$ | 1.546 | 1.7538 | 27.65 |
| | | | Y 3.651 | θ $-15.13°$ |
| 3 | 107.965 | 2.643 | 1.6983 | 48.83 |
| 4 | 274.646 | | | |
| 5 | 229.721 | | 1.7440 | 44.70 |
| | | | Y $-13.881$ | θ $-8.230°$ |
| | | | Z 37.813 | |
| 6 | $R_y$ $-109.079$ | | 1.7440 | 44.70 |
| | $R_x$ $-74.156$ | | Y 5.398 | θ $29.535°$ |
| | $K_y$ $-2.240293$ | | Z 55.846 | |
| | $K_x$ $-2.129352$ | | | |
| | AR $-5.37721 \times 10^{-7}$ | | | |
| | BR $-2.03548 \times 10^{-13}$ | | | |
| | AP $-0.213473$ | | | |
| | BP $-2.82206$ | | | |
| 7 | $R_y$ $-145.328$ | | 1.7440 | 44.70 |
| | $R_x$ $-62.397$ | | Y $-4.849$ | θ $21.46°$ |
| | $K_y$ 0 | | Z 37.250 | |
| | $K_x$ 0 | | | |
| | AR $-8.36498 \times 10^{-7}$ | | | |
| | BR $-4.75521 \times 10^{-10}$ | | | |
| | AP $-0.458634$ | | | |
| | BP $-0.508777$ | | | |
| 8 | $-580.390$ | | Y $-40.489$ | θ $-56.71°$ |
| | | | Z 43.912 | |
| 9 | (display device) | | Y $-36.433$ | θ $-20.70°$ |
| | | | Z 71.503 | |
| (1) | $R_{y3}/R_{y2} = 1.332$ | | | |
| (2) | $R_{y2}/R_{x2} = 1.471$ | | | |
| (3) | $\beta = 60.46°$ | | | |

Example 8

| Surface No. | Radius of curvature | Surface separation | Refractive index (Eccentricity) | Abbe's No. (Inclination angle) |
|---|---|---|---|---|
| 1 | ∞ (pupil) | 32.000 | | |
| 2 | $-208.872$ | | 1.7441 | 28.06 |
| 3 | $-187.213$ | | 1.7440 | 44.70 |
| | | | Z 10.000 | θ $37.24°$ |
| 4 | $R_y$ $-88.905$ | | 1.7440 | 44.70 |
| | $R_x$ $-65.176$ | | Z 16.453 | θ $32.00°$ |
| | $K_y$ $-0.308154$ | | | |
| | $K_x$ 0.092333 | | | |
| | AR $-1.50518 \times 10^{-7}$ | | | |
| | BR $1.88192 \times 10^{-11}$ | | | |
| | AP $-0.193524$ | | | |
| | BP $-1.65049$ | | | |
| 5 | $-187.213$ | | 1.7441 | 28.06 |
| | | | Z 10.000 | θ $37.24°$ |
| 6 | $R_y$ $-95.287$ | | 1.5027 | 68.73 |
| | $R_x$ $-51.176$ | | Y $-13.000$ | θ $20.00°$ |
| | $K_y$ 0 | | Z 4.170 | |
| | $K_x$ 0 | | | |
| | AR $-1.20201 \times 10^{-6}$ | | | |
| | BR $-3.79522 \times 10^{-15}$ | | | |
| | AP $-0.409678$ | | | |
| | BP $-43.1252$ | | | |
| 7 | 563.531 | | Y $-32.291$ | θ $-49.65°$ |
| | | | Z 9.76 | |
| 8 | (display device) | | Y $-31.909$ | θ $-27.97°$ |
| | | | Z 62.573 | |
| (1) | $R_{y3}/R_{y2} = 1.072$ | | | |
| (2) | $R_{y2}/R_{x2} = 1.364$ | | | |
| (3) | $\beta = 58°$ | | | |

Example 9

| Surface No. | Radius of curvature | Surface separation | Refractive index (Eccentricity) | Abbe's No. (Inclination angle) |
|---|---|---|---|---|
| 1 | ∞ (pupil) | 32.000 | | |
| 2 | R $-187.585$ | | 1.6322 | 48.51 |
| | K $-50.20556$ | | Y $-16.345$ | θ $-3.40°$ |
| | A $4.59937 \times 10^{-7}$ | | | |
| | B $2.58439 \times 10^{-10}$ | | | |

Example 9

| Surface No. | Radius of curvature | Surface separation | Refractive index (Eccentricity) | Abbe's No. (Inclination angle) |
|---|---|---|---|---|
| 3 | 49.338 | | 1.6418 Y −6.593 Z 11.624 | 41.23 θ 30.19° |
| 4 | 166.366 | | 1.5572 Y −12.392 Z 21.710 | 64.10 θ 35.42° |
| 5 | $R_y$ −95.046 $R_x$ −66.340 $K_y$ −0.718117 $K_x$ −0.300704 AR −5.22263 × $10^{-8}$ BR −7.85534 × $10^{-12}$ AP 1.16601 BP −1.4734 | | 1.5572 Y 10.000 Z 11.000 | 64.10 θ 40.00° |
| 6 | 166.366 | | 1.5572 Y −12.392 Z 21.710 | 64.10 θ 35.42° |
| 7 | 49.338 | | 1.6418 Y −6.593 Z 11.624 | 41.23 θ 30.19° |
| 8 | $R_y$ −137.574 $R_x$ −47.520 $K_y$ 0 $K_x$ 0 AR 1.21024 × $10^{-9}$ BR 3.74455 × $10^{-14}$ AP −10.0983 BP −17.3357 | | 1.6322 Y −0.499 Z 0.086 | 48.51 θ 18.89° |
| 9 | 176.596 | | Y −40.419 Z 8.855 | θ −55.47° |
| 10 | (display device) | | Y −42.854 Z 53.820 | θ −43.38° |
| (1) | $R_{y3}/R_{y2}$ = 1.447 | | | |
| (2) | $R_{y2}/R_{x2}$ = 1.433 | | | |
| (3) | α = 50° | | | |

Example 10

| Surface No. | Radius of curvature | Surface separation | Refractive index (Eccentricity) | Abbe's No. (Inclination angle) |
|---|---|---|---|---|
| 1 | ∞ (pupil) | 32.000 | | |
| 2 | R −175.289 K −155.219792 A 8.04348 × $10^{-7}$ B 9.27703 × $10^{-10}$ | | 1.5941 Y −14.072 | 44.13 θ 10.00° |
| 3 | −426.084 | | Y −9.117 Z 9.581 | θ 25.38° |
| 4 | −75.870 | | 1.6287 Y 3.984 Z 11.611 | 58.59 θ 35.90° |
| 5 | $R_y$ −80.178 $R_x$ −63.594 $K_y$ −0.869793 $K_x$ −0.688484 AR −7.17251 × $10^{-8}$ BR −6.38727 × $10^{-14}$ AP −0.260622 BP 3.85581 | | 1.6287 Y 10.000 Z 11.000 | 58.59 θ 40.00° |
| 6 | −75.870 | | Y 3.984 Z 11.611 | θ 35.90° |
| 7 | −426.084 | | 1.5941 Y −9.117 Z 9.581 | 44.13 θ 25.38° |
| 8 | $R_y$ −211.470 $R_x$ −55.393 $K_y$ 0 $K_x$ 0 AR 1.18093 × $10^{-9}$ BR 2.01542 × $10^{-15}$ AP −9.048087 BP −14.0853 | | 1.5941 Y −1.313 Z 0.568 | 44.13 θ 9.477° |
| 9 | −32.943 | | Y −43.758 Z 8.855 | θ −59.05° |
| 10 | (display device) | | Y −44.400 Z 50.724 | θ −29.63° |
| (1) | $R_{y3}/R_{y2}$ = 2.638 | | | |
| (2) | $R_{y2}/R_{x2}$ = 1.261 | | | |
| (3) | α = 50° | | | |

Example 11

| Surface No. | Radius of curvature | Surface separation | Refractive index (Eccentricity) | Abbe's No. (Inclination angle) |
|---|---|---|---|---|
| 1 | ∞ (pupil) | 30.322 | | |
| 2 | 103.550 | | 1.6013 Y −9.898 | 61.30 θ −19.05° |
| 3 | $R_y$ −202.010 $R_x$ −144.280 $K_y$ −5.9195 $K_x$ −14.752645 AR −1.99548 × $10^{-7}$ BR −9.54327 × $10^{-22}$ AP −0.427534 BP 2.19465 × $10^{-3}$ | | 1.6013 Y 14.676 Z 21.879 | 61.30 θ 40.61° |
| 4 | 225.710 | | 1.7550 Y −9.000 Z 10.891 | 27.60 θ 33.00° |
| 5 | −379.519 | | 1.7550 Y 4.142 Z −4.425 | 27.60 θ 40.31° |
| 6 | 225.710 | | 1.6013 Y −9.000 Z 10.891 | 61.30 θ 33.00° |
| 7 | 139.834 | | Y −20.502 Z 26.745 | θ −18.00° |
| 8 | (display device) | | Y −34.594 Z 65.977 | θ 6.59° |
| (1) | $R_{y3}/R_{y2}$ = 1.879 | | | |
| (2) | $R_{y2}/R_{x2}$ = 1.400 | | | |
| (3) | α = 68.44° | | | |

Example 12

| Surface No. | Radius of curvature | Surface separation | Refractive index (Eccentricity) | Abbe's No. (Inclination angle) |
|---|---|---|---|---|
| 1 | ∞ (pupil) | 28.695 | | |
| 2 | 84.793 | | 1.7440 Y −8.729 | 44.70 θ −13.34° |
| 3 | $R_y$ −862.801 $R_x$ −257.918 $K_y$ −316.231372 $K_x$ −58.426803 AR −8.67744 × $10^{-9}$ BR −5.1966 × $10^{-22}$ AP −1.50396 BP 2.17709 × $10^3$ | | 1.7440 Y 1.554 Z 39.013 | 44.70 θ 51.16° |
| 4 | 147.700 | | 1.7374 Y −20.728 Z 31.663 | 28.35 θ 45.58° |

Example 12

| Surface No. | Radius of curvature | Surface separation | Refractive index (Eccentricity) | Abbe's No. (Inclination angle) |
|---|---|---|---|---|
| 5 | 663.675 | | 1.7374 Y 9.039 Z −3.498 | 28.35 θ 44.57° |
| 6 | 147.700 | | 1.7440 Y −20.728 Z 31.663 | 44.70 θ 45.58° |
| 7 | 126.331 | | Y −61.667 Z 50.956 | θ −1.28° |
| 8 | (display device) | | Y −47.586 Z 93.357 | θ 15.22° |
| (1) | $R_{y3}/R_{y2} = 0.769$ | | | |
| (2) | $R_{y2}/R_{x2} = 3.345$ | | | |
| (3) | $\alpha = 52.18°$ | | | |

Example 13

| Surface No. | Radius of curvature | Surface separation | Refractive index (Eccentricity) | Abbe's No. (Inclination angle) |
|---|---|---|---|---|
| 1 | ∞ (pupil) | 32.000 | | |
| 2 | −203.051 | 18.000 | 1.6620 | 53.23 θ −12.00° |
| 3 | $R_y$ −93.830 $R_x$ −77.751 $K_y$ 1.005172 $K_x$ −0.782108 AR −8.24396 × 10$^{-9}$ BR 1.36575 × 10$^{-11}$ AP 0.197482 BP −0.0934513 | −19.000 | 1.6620 Y 3.478 | 53.23 θ 33.00° |
| 4 | $R_y$ −85.607 $R_x$ −56.920 $K_y$ 0 $K_x$ 0 AR 3.15046 × 10$^{-7}$ BR −3.70111 × 10$^{-11}$ AP −2.22485 BP 2.37352 | 7.000 | 1.6620 Y −13.000 | 53.23 θ 20.00° |
| 5 | −33.119 | 1.682 | 1.7550 Y −34.962 | 27.60 θ −50.28° |
| 6 | 927.298 | | | |
| 7 | (display device) | | Y −37.016 Z 46.780 | θ −41.30° |
| (1) | $R_{y3}/R_{y2} = 0.912$ | | | |
| (2) | $R_{y2}/R_{x2} = 1.207$ | | | |
| (3) | $\alpha = 69.00°$ | | | |

Example 14

| Surface No. | Radius of curvature | Surface separation | Refractive index (Eccentricity) | Abbe's No. (Inclination angle) |
|---|---|---|---|---|
| 1 | ∞ (pupil) | 25.000 | | |
| 2 | 204.694 | | 1.6200 Y −3.185 | 60.30 θ −15.00° |
| 3 | $R_y$ −159.563 $R_x$ −100.471 $K_y$ −2.036793 $K_x$ −2.676128 AR −7.18684 × 10$^{-10}$ BR −1.40819 × 10$^{-11}$ AP 11.2006 BP 1.7909 | | 1.6200 Y 2.186 Z 14.331 | 60.30 θ 26.98° |
| 4 | $R_y$ −630.426 $R_x$ −146.568 $K_y$ 0 $K_x$ 0 AR 1.87526 × 10$^{-9}$ BR −2.76668 × 10$^{-12}$ AP 0.0211611 BP 4.44627 | | 1.6200 Y −15.636 Z 0.190 | 60.30 θ 12.78° |
| 5 | −90.000 | | Y −38.038 Z 5.289 | θ −43.90° |
| 6 | −89.721 | 1.699 | 1.7550 Y −38.575 Z 8.832 | 27.60 θ −43.01° |
| 7 | 83.786 | | | |
| 8 | (display device) | | Y −37.157 Z 52.595 | θ −12.20° |
| (1) | $R_{y3}/R_{y2} = 3.951$ | | | |
| (2) | $R_{y2}/R_{x2} = 1.588$ | | | |
| (3) | $\alpha = 63.02°$ | | | |

Example 15

| Surface No. | Radius of curvature | Surface separation | Refractive index (Eccentricity) | Abbe's No. (Inclination angle) |
|---|---|---|---|---|
| 1 | ∞ (pupil) | 33.963 | | |
| 2 | −161.077 | 6.808 | 1.7440 Y 1.398 | 44.70 θ −14.96° |
| 3 | −19.730 | 9.000 | 1.7356 | 38.60 |
| 4 | $R_y$ −132.032 $R_x$ −79.749 $K_y$ −3.401113 $K_x$ −0.597576 AR −4.35342 × 10$^{-7}$ BR 1.37675 × 10$^{-11}$ AP 1.54099 × 10 BP 9.89904 | −9.000 | 1.7356 Y 9.652 | 38.60 θ 46.62° |
| 5 | $R_y$ −323.588 $R_x$ −87.689 $K_y$ 0 $K_x$ 0 AR −1.19882 × 10$^{-6}$ BR −6.52387 × 10$^{-10}$ AP −0.358157 BP −0.394845 | | 1.7356 Y −11.780 | 38.60 θ 34.70° |
| 6 | −35.593 | 1.569 | 1.6206 Y −33.870 Z 20.00 | 36.28 θ −34.42° |
| 7 | 146.141 | | | |
| 8 | (display device) | | Y −38.172 | θ −6.45° |
| (1) | $R_{y3}/R_{y2} = 2.451$ | | | |
| (2) | $R_{y2}/R_{x2} = 1.656$ | | | |
| (3) | $\alpha = 58.34°$ | | | |

Example 16

| Surface No. | Radius of curvature | Surface separation | Refractive index (Eccentricity) | Abbe's No. (Inclination angle) |
|---|---|---|---|---|
| 1 | ∞ (pupil) | 26.388 | | |
| 2 | 60.936 | 5.977 | 1.6392 Y −0.369 | 56.73 θ −14.18° |
| 3 | −45.628 | | | |
| 4 | −31.506 | | Y 0.947 Z 36.416 | θ −5.375° |

-continued

Example 16

| Surface No. | Radius of curvature | Surface separation | Refractive index (Eccentricity) | Abbe's No. (Inclination angle) |
|---|---|---|---|---|
| 5 | $R_y$ -183.538 $R_x$ -112.045 $K_y$ -13.897525 $K_x$ -3.33359 AR -4.04909 × $10^{-7}$ BR 2.09722 × $10^{-5}$ AP -0.00191601 BP 2.09722 × $10^{3}$ | | 1.7550 Y -4.332 Z 51.975 | 27.60 θ 30.69° |
| 6 | $R_y$ 16770.468 $R_x$ 13944.321 $K_y$ 0 $K_x$ 0 AR -5.74255 × $10^{-8}$ BR -1.14233 × $10^{-11}$ AP -0.17785 BP -0.272399 | | 1.7550 Y -6.807 Z 31.435 | 27.60 θ 27.70° |
| 7 | 222.419 | | Y -41.467 Z 49.118 | θ -21.00° |
| 8 | (display device) | | Y -28.352 Z 67.095 | θ 15.16° |
| (1) | $R_{y3}/R_{y2}$ = -91.373 | | | |
| (2) | $R_{y2}/R_{x2}$ = 1.638 | | | |
| (3) | α = 59.31° | | | |

Example 17

| Surface No. | Radius of curvature | Surface separation | Refractive index (Eccentricity) | Abbe's No. (Inclination angle) |
|---|---|---|---|---|
| 1 | ∞ (pupil) | 29.316 | | |
| 2 | 181.001 | | 1.5626 | 63.71 |
| 3 | -284.969 | | 1.5626 Y 17.325 Z 27.476 | 63.71 θ 27.00° |
| 4 | 58.299 | | 1.6319 Y -21.861 Z 22.195 | 38.59 θ 71.46° |
| 5 | $R_y$ 233.704 $R_x$ 166.891 | | 1.6319 Y -22.800 Z 16.701 | 38.59 θ 68.10° |
| 6 | 58.299 | | 1.6319 Y -21.861 Z 22.195 | 38.59 θ 71.46° |
| 7 | -448.802 | | Y 14.600 Z 29.584 | θ 94.59° |
| 8 | (display device) | | Y 20.097 Z 45.137 | θ 88.89° |
| (1) | $R_{y3}/R_{y2}$ = -0.82 | | | |
| (2) | $R_{y2}/R_{x2}$ = 1 | | | |
| (3) | α = 63.00° | | | |

Figure 18A:
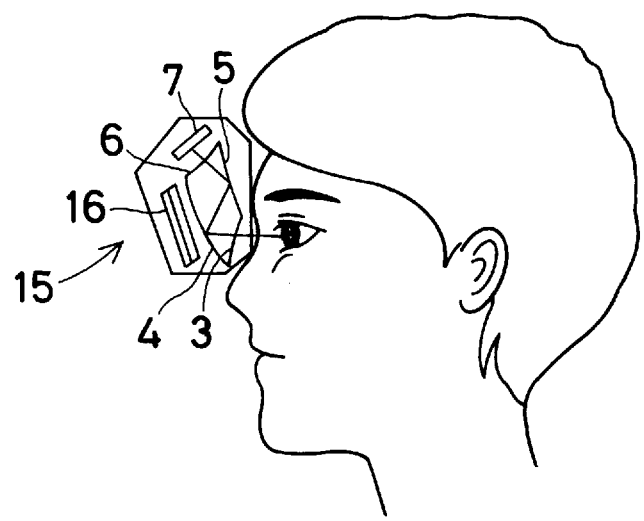
FIGS. 18(a) and 18(b) are sectional and perspective views showing a head-mounted image display apparatus according to the present invention.
Figure 18B:
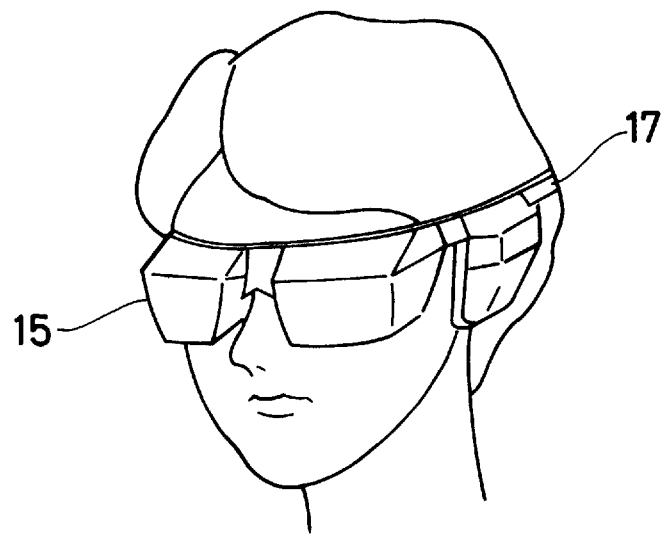

Although examples of the image display apparatus according to the present invention have been described above, it should be noted that the present invention is not necessarily limited to these examples, and that various modifications may be imparted thereto. To arrange the image display apparatus according to the present invention as a head-mounted image display apparatus (HMD) 15, as shown in the sectional view of FIG. 18(a) and the perspective view of FIG. 18(b), the HMD 15 is fitted to the observer's head by using a headband 17, for example, which is attached to the HMD 15. In this example of use, the HMD 15 may be arranged such that the second surface 4 of the ocular optical system is formed by using a semitransparent mirror (half-mirror), and a liquid crystal shutter 16 is provided in front of the half-mirror, thereby enabling an outside world image to be selectively observed or superimposed on the image of the image display device 7.

Figure 19:
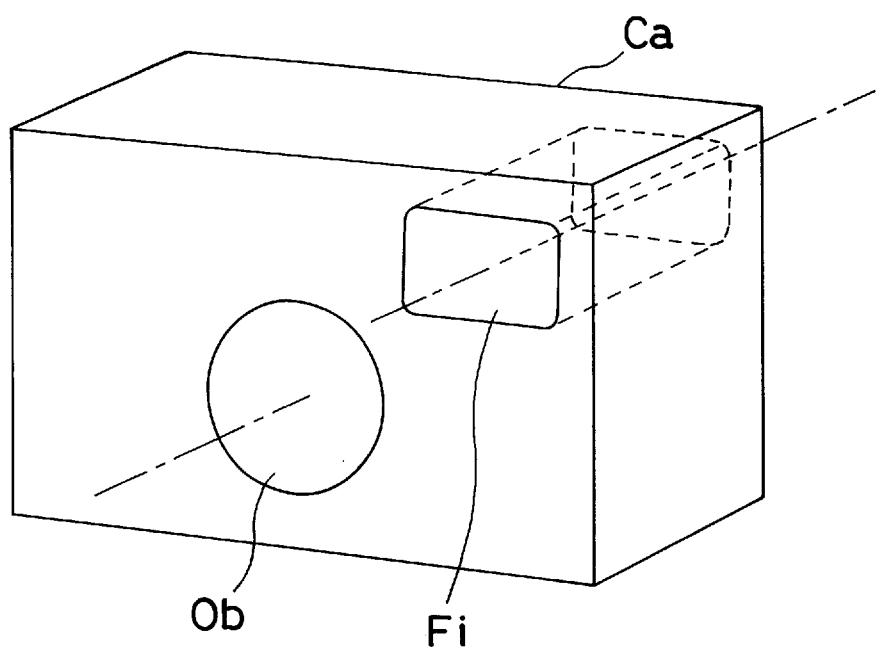
FIG. 19 shows an arrangement in a case where an ocular optical system according to the present invention is used as an imaging optical system.
Figure 20:
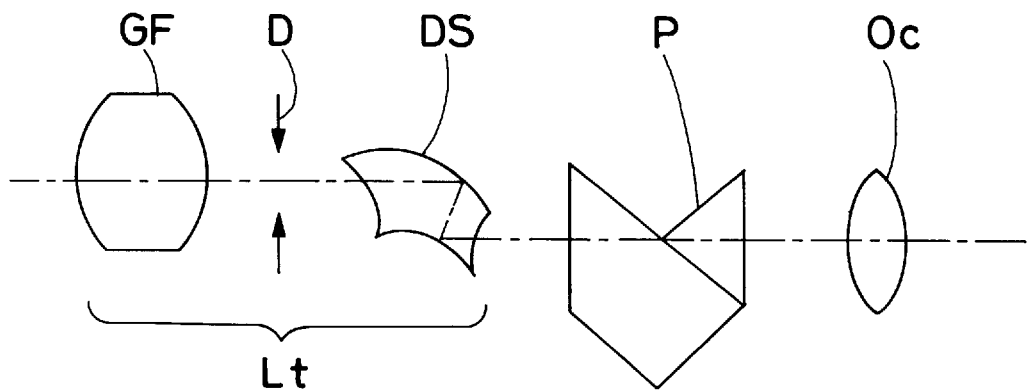
FIG. 20 shows an arrangement in a case where an ocular optical system according to the present invention is used as an imaging optical system.
Figure 21A:
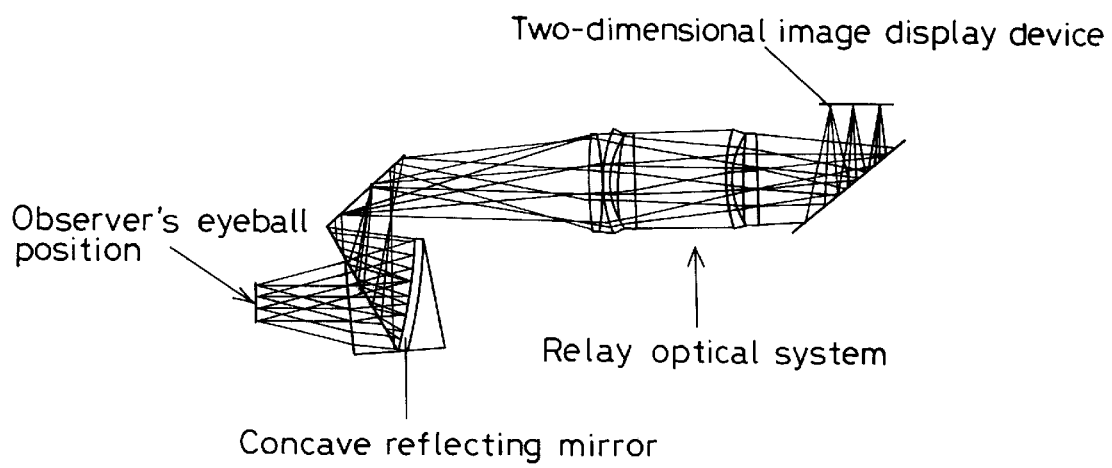
FIGS. 21(a) and 21(b) show the optical system of a conventional image display apparatus.
Figure 21B:
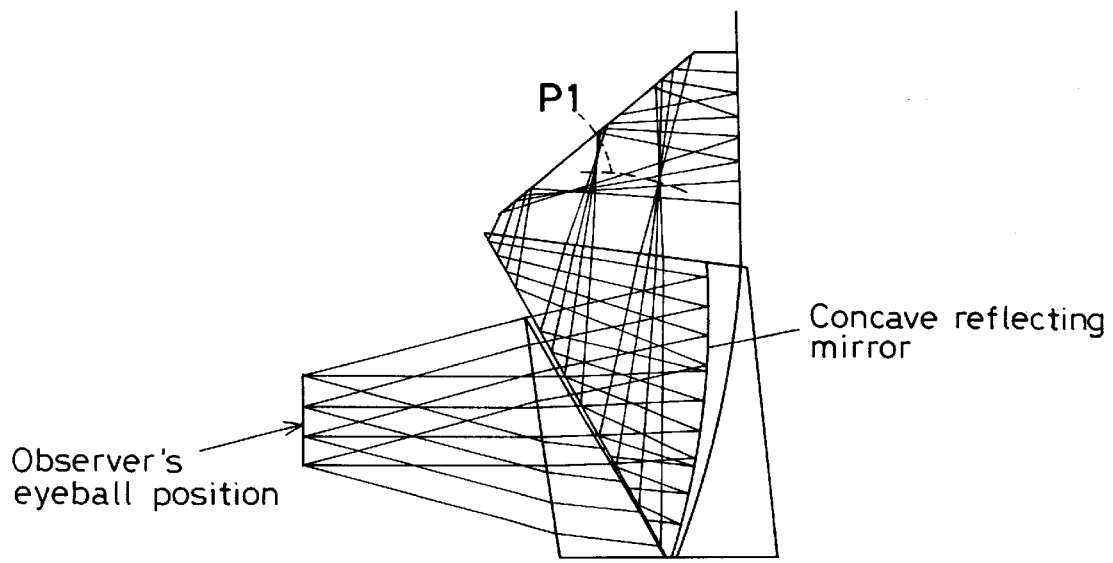
Figure 22:
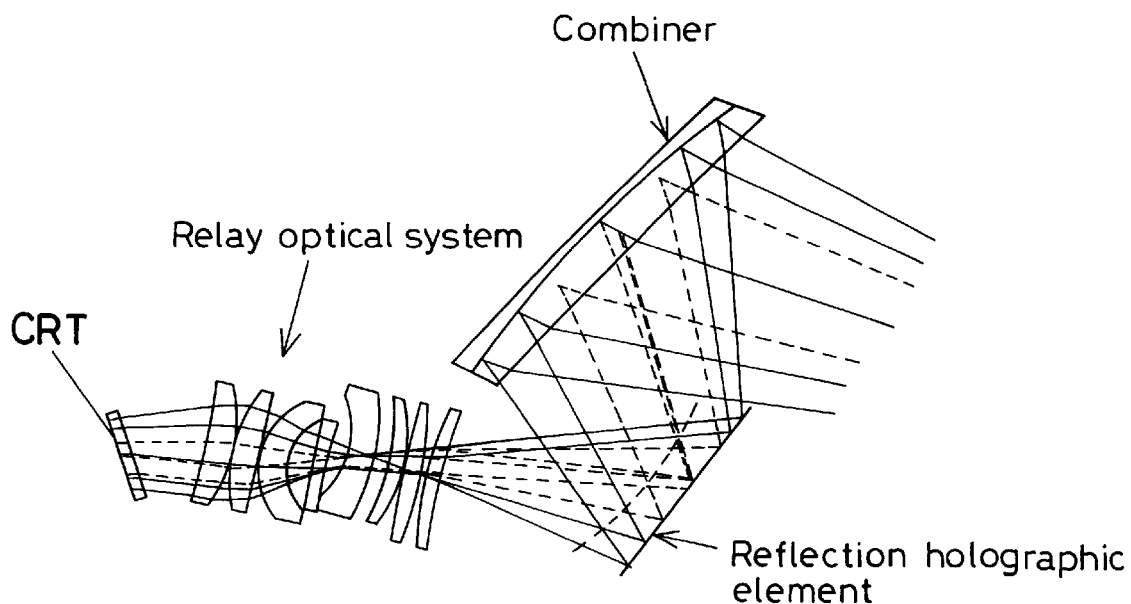
FIG. 22 shows the optical system of another conventional image display apparatus.
Figure 23:
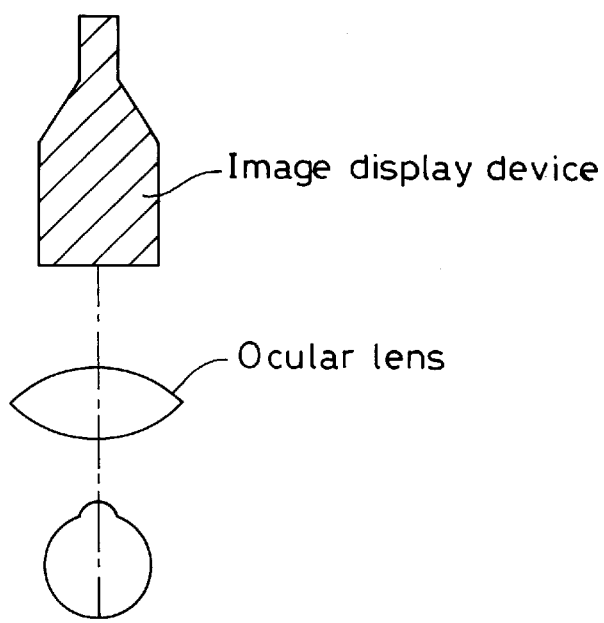
FIG. 23 shows the optical system of still another conventional image display apparatus.
Figure 24:
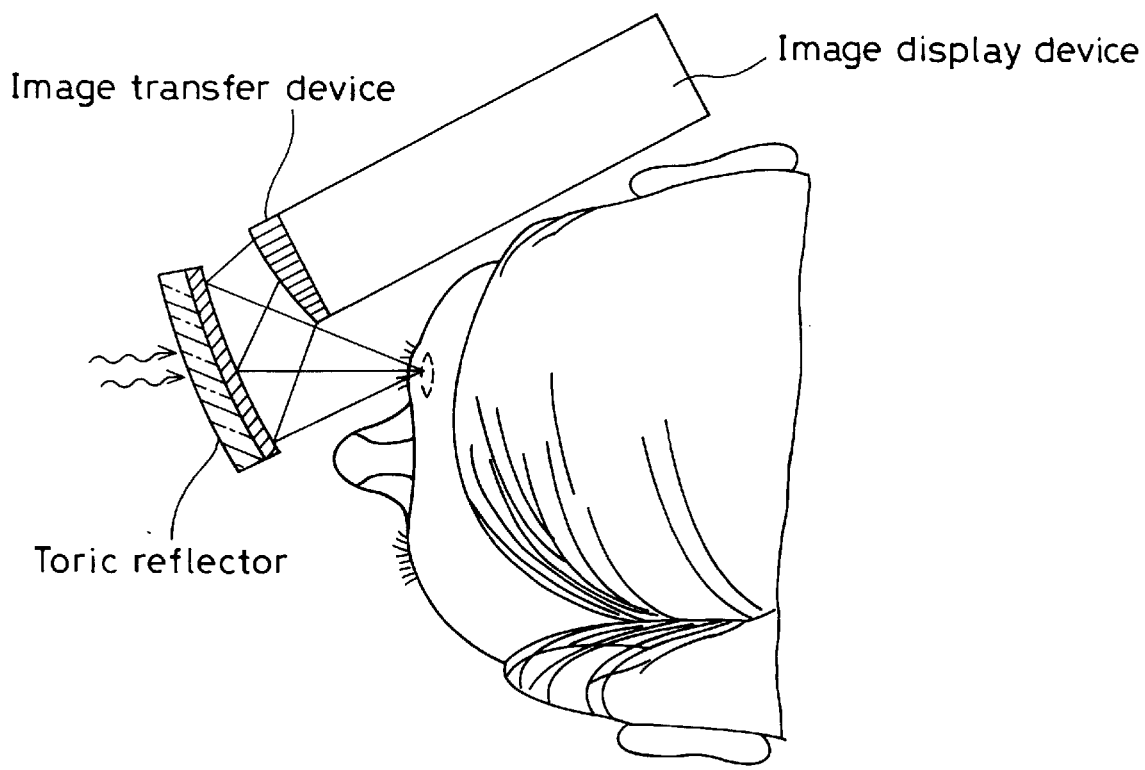
FIG. 24 shows the optical system of a further conventional image display apparatus.

Further, the ocular optical system of the image display apparatus according to the present invention can be used as an imaging optical system. For example, as shown in the perspective view of FIG. 19, the ocular optical system may be used in a finder optical system $F_i$ of a compact camera $C_a$ in which a photographic optical system $O_b$ and the finder optical system $F_i$ are provided separately in parallel to each other. FIG. 20 shows the arrangement of an optical system in a case where an ocular optical system according to the present invention is used as such an imaging optical system. As illustrated, an ocular optical system DS according to the present invention is disposed behind a front lens group GF and an aperture diaphragm D, thereby constituting an objective optical system $L_r$. An image that is formed by the objective optical system $L_r$ is erected by a Porro prism P, in which there are four reflections, provided at the observer side of the objective optical system $L_r$, thereby enabling an erect image to be observed through an ocular lens $O_c$.

As will be clear from the foregoing description, the present invention makes it possible to provide an image display apparatus which has a wide field angle and is extremely small in size and light in weight.

What I claim is:

1. An image display apparatus, comprising:
an image display device for displaying an image; and
an ocular optical system for projecting the image displayed by said image display device and leading the projected image to an observer's eyeball,
said ocular optical system having at least four surfaces which include, in order in which light rays pass in backward ray tracing from said observer's eyeball to said image display device, a first surface which is a refracting surface, a second surface which is a reflecting surface of positive power facing said first surface and decentered with respect to an observer's visual axis, a third surface which is a reflecting surface facing said second surface and decentered with respect to the observer's visual axis that has been reflected by said second surface, and a fourth surface which is a refracting surface closest to said image display device,
said four surfaces forming a prism, said prism being arranged such that a bundle of light rays emitted from said image display device passes through said prism and is led to a center and a periphery of a pupil of said observer's eyeball,
wherein:
at least two of said at least four surfaces have a finite curvature radius;
a space formed by said first to fourth surfaces is filled with a medium having a refractive index larger than 1;
said two reflecting surfaces are disposed such that a principal ray extending from said observer's eyeball to said image display device does not intersect its own path in said ocular optical system; and
a first-order image of said image display device is formed on a retina of said observer's eyeball.

2. An image display apparatus according to claim 1, wherein said third surface is a reflecting surface having a convex surface directed toward said second surface.

3. An image display apparatus according to claim 2, wherein any one of said first to fourth surfaces is a decentered aspherical surface.

4. An image display apparatus according to claim 3, which satisfies the following condition in a case where a vertical plane containing said observer's visual axis is defined as a YZ-plane:

$$0 < R_{y3}/R_{y2} < 4 \qquad (1)$$

where $R_{y2}$ is a curvature radius of said second surface in the YZ-plane, and $R_{y3}$ is a curvature radius of said third surface in the YZ-plane.

5. An image display apparatus according to claim 3 or 4, wherein any one of said first to fourth surfaces is an anamorphic surface.

6. An image display apparatus according to claim 3, which satisfies the following condition in a case where a vertical plane containing said observer's visual axis is defined as a YZ-plane, and a horizontal plane containing said observer's visual axis is defined as an XZ-plane:

$$R_{y2}/R_{x2} > 1 \qquad (2)$$

where $R_{y2}$ is a curvature radius of said second surface in the YZ-plane, and $R_{x2}$ is a curvature radius of said second surface in the XZ-plane.

7. An image display apparatus according to claim 6, wherein either one of said first and fourth surfaces of said ocular optical system is tilted or decentered with respect to said visual axis.

8. An image display apparatus according to claim 7, which satisfies the following condition:

$$30° < \alpha < 80° \qquad (3)$$

where $\alpha$ is an angle between said second surface of said ocular optical system and said visual axis.

9. An image display apparatus according to claim 8, wherein said image display device has a display surface which is tilted with respect to said observer's visual axis.

10. An image display apparatus, comprising:

an image display device for displaying an image; and an ocular optical system for projecting the image displayed by said image display device and leading the projected image to an observer's eyeball, said ocular optical system including a decentered optical element having at least four surfaces which include, in order in which light rays pass in backward ray tracing from said observer's eyeball to said image display device, a first surface which is a refracting surface, a second surface which is a reflecting surface of positive power facing said first surface and decentered with respect to an observer's visual axis, a third surface which is a reflecting surface facing said second surface and decentered with respect to said observer's visual axis that has been reflected by said second surface, and a fourth surface which is a refracting surface closest to said image display device, said four surfaces forming a prism, said prism being arranged such that a bundle of light rays emitted from said image display device passes through said prism and is led to a center and periphery of a pupil of said observer's eyeball, wherein at least two of said at least four surfaces have a finite curvature radius, and a space formed by said first to fourth surfaces is filled with a medium having a refractive index larger than 1, said ocular optical system further including at least one optical surface having refracting action, said decentered optical element and said at least one optical surface being disposed in an optical path extending from said image display device to said observer's eyeball.

11. An image display apparatus according to claim 10, wherein said at least one optical surface is formed from a surface which produces chromatic aberration which is approximately equal in quantity but opposite in sign to chromatic aberration produced by said first surface.

12. An image display apparatus according to claim 11, wherein said at least one optical surface is disposed between said observer's eyeball and the first surface of said decentered optical element.

13. An image display apparatus according to claim 11, wherein said at least one optical surface is disposed between the second and third surfaces of said decentered optical element.

14. An image display apparatus according to claim 11, wherein said at least one optical surface is disposed between the fourth surface of said decentered optical element and said image display device.

15. An image display apparatus according to claim 11, wherein said at least one optical surface is decentered with respect to said observer's visual axis.

16. An image display apparatus according to claim 10, wherein a power of said at least one optical surface, together with refractive indices and Abbe's numbers of mediums lying in front of and behind said at least one optical surface, is set such that said at least one optical surface produces chromatic aberration which is approximately equal in quantity but opposite in sign to chromatic aberration produced by said first surface.

17. An image display apparatus according to any one of claims 10 to 15, wherein said at least one optical surface is a cemented surface.

18. An image display apparatus according to claim 17, wherein said at least one optical surface and said decentered optical element form an air lens.

19. An image display apparatus according to any one of claims 1 to 4 or 6 to 15, further comprising means for positioning both said image display device said ocular optical system with respect to an observer's head.

20. An image display apparatus according to any one of claims 1 to 4 or 6 to 15, further comprising means for supporting both said image display device and said ocular optical system with respect to an observer's head so that said image display apparatus can be fitted to said observer's head.

21. An image display apparatus according to any one of claims 1 to 4 or 6 to 15, further comprising means for supporting at least a pair of said image display apparatuses at a predetermined spacing.

22. An image display apparatus according to any one of claims 1 to 4 or 6 to 15, wherein said ocular optical system is used as an imaging optical system.

\* \* \* \* \*